(12) United States Patent
Tanaka et al.

(10) Patent No.: US 12,130,441 B2
(45) Date of Patent: Oct. 29, 2024

(54) RETINAL PROJECTION DISPLAY DEVICE, HEAD-MOUNTED DISPLAY DEVICE, AND OPTOMETRIC DEVICE

(71) Applicants: Shu Tanaka, Osaka (JP); Suguru Sangu, Kanagawa (JP); Kayoko Fujimura, Osaka (JP)

(72) Inventors: Shu Tanaka, Osaka (JP); Suguru Sangu, Kanagawa (JP); Kayoko Fujimura, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/371,036

(22) Filed: Sep. 21, 2023

(65) Prior Publication Data
US 2024/0111160 A1 Apr. 4, 2024

(30) Foreign Application Priority Data
Sep. 30, 2022 (JP) ................. 2022-158568

(51) Int. Cl.
G02B 27/01 (2006.01)
G02B 26/10 (2006.01)
G02B 27/00 (2006.01)

(52) U.S. Cl.
CPC ....... *G02B 27/0172* (2013.01); *G02B 26/105* (2013.01); *G02B 27/0093* (2013.01); *G02B 27/0179* (2013.01); *G02B 2027/014* (2013.01); *G02B 2027/0178* (2013.01); *G02B 2027/0187* (2013.01)

(58) Field of Classification Search
CPC ............. G02B 26/105; G02B 27/0093; G02B 27/0172; G02B 27/0179; G02B 2027/014; G02B 2027/0178; G02B 2027/0187
See application file for complete search history.

(56) References Cited

U.S. PATENT DOCUMENTS

| | | | |
|---|---|---|---|
| 8,976,087 B2* | 3/2015 | Takeda | G02B 27/017 359/630 |
| 9,239,462 B2* | 1/2016 | Takeda | G02B 26/101 |
| 11,157,072 B1* | 10/2021 | Topliss | G02B 27/0093 |
| 12,019,797 B2* | 6/2024 | Heshmati | G02B 26/0833 |

(Continued)

FOREIGN PATENT DOCUMENTS

| | | |
|---|---|---|
| JP | 5311887 | 10/2013 |
| JP | 5806992 | 11/2015 |

(Continued)

*Primary Examiner* — Gene W Lee
(74) *Attorney, Agent, or Firm* — XSENSUS LLP

(57) ABSTRACT

A retinal projection display device for projection of an image onto a retina of a wearer wearing an eyeglass-type support is provided. The retinal projection display device includes the eyeglass-type support including a temple; a light source; an optical scanner disposed in the temple and configured to scan light from the light source so as to form the image; a projector configured to project the image formed by the optical scanner onto the retina; an optical deflector disposed in the temple and configured to change a projection direction of the image formed by the optical scanner; and a translation member configured to translate the optical scanner and the optical deflector in a direction in which the temple extends.

16 Claims, 22 Drawing Sheets

(56) References Cited

U.S. PATENT DOCUMENTS

| | | |
|---|---|---|
| 2006/0262398 A1 | 11/2006 | Sangu et al. |
| 2012/0235027 A1 | 9/2012 | Sangu et al. |
| 2014/0078592 A1 | 3/2014 | Hotta et al. |
| 2015/0260982 A1 | 9/2015 | Sangu |
| 2016/0316142 A1 | 10/2016 | Sangu |
| 2017/0285343 A1* | 10/2017 | Belenkii .............. H04N 13/344 |
| 2019/0056596 A1 | 2/2019 | Bailey et al. |
| 2019/0286228 A1 | 9/2019 | Sangu |
| 2020/0285058 A1 | 9/2020 | Sangu et al. |
| 2022/0221722 A1 | 7/2022 | Yoshida et al. |
| 2022/0236563 A1 | 7/2022 | Tanaka et al. |
| 2022/0299762 A1 | 9/2022 | Yoshikawa et al. |
| 2022/0373804 A1* | 11/2022 | Noui .................. G02B 27/0176 |
| 2023/0001654 A1* | 1/2023 | Reitterer .............. G02B 27/283 |
| 2023/0054450 A1* | 2/2023 | Heshmati ........... G02B 27/0093 |

FOREIGN PATENT DOCUMENTS

| | | |
|---|---|---|
| JP | 6769974 | 10/2020 |
| JP | 2022-146676 | 10/2022 |

* cited by examiner

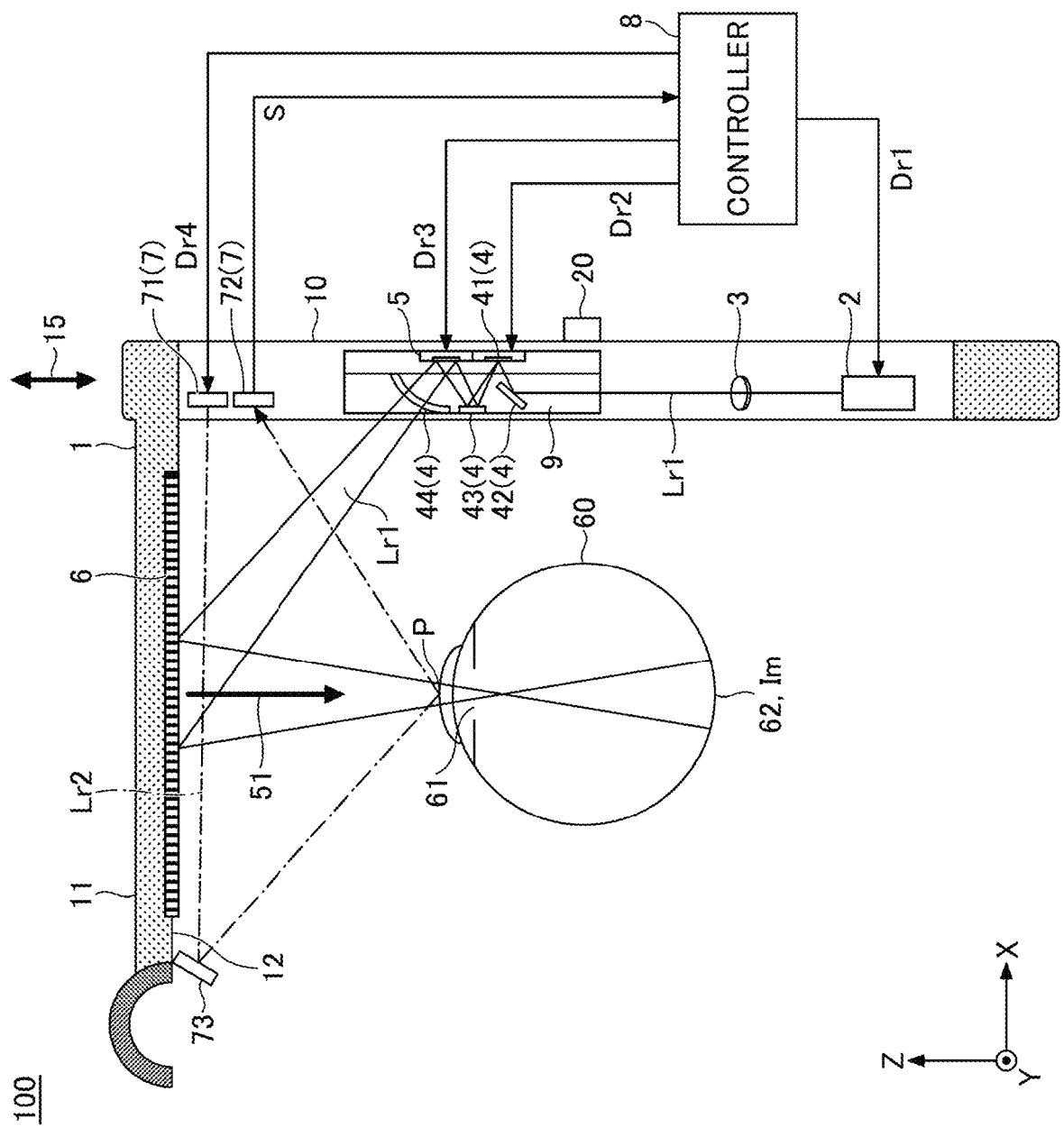

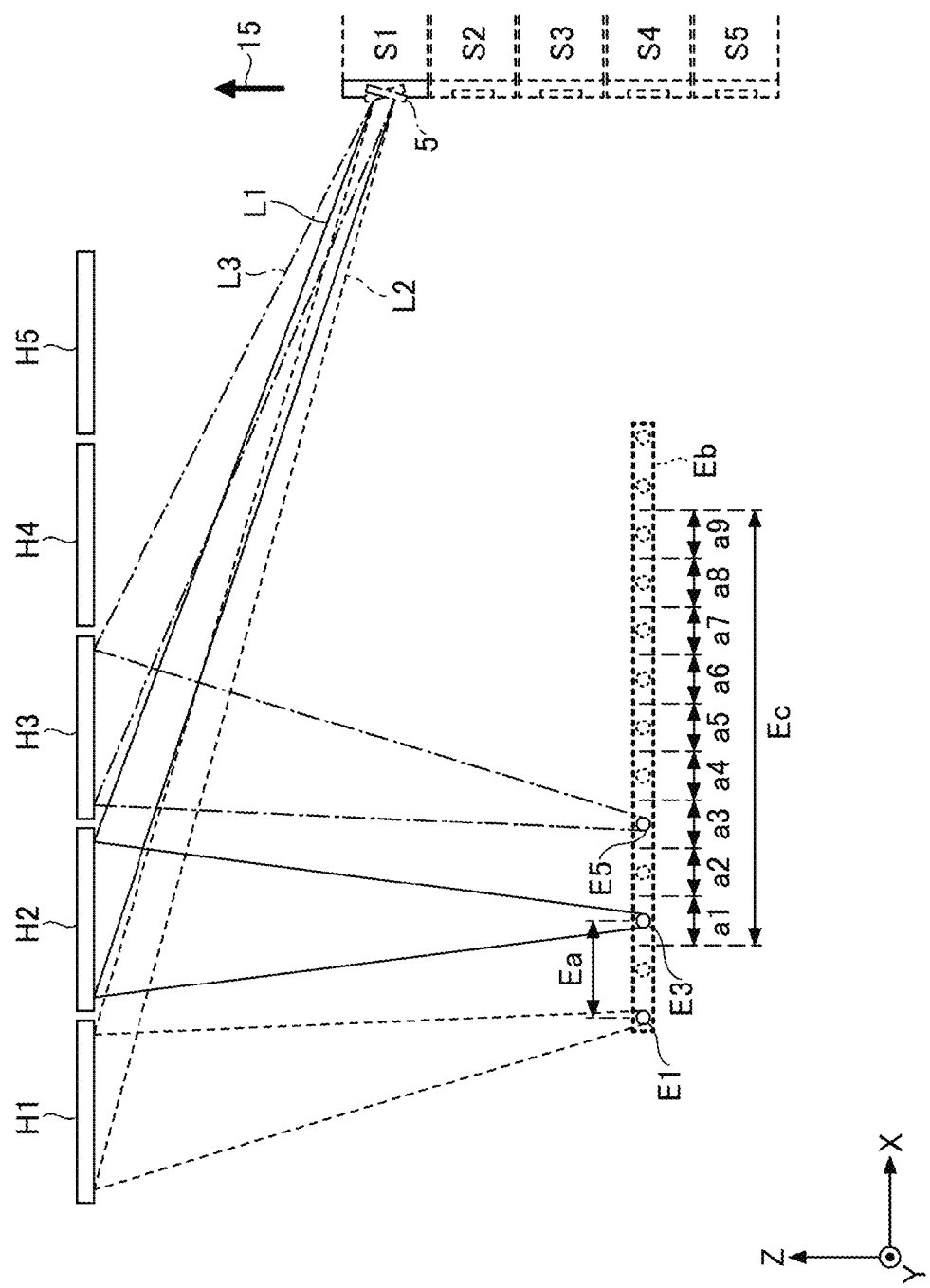

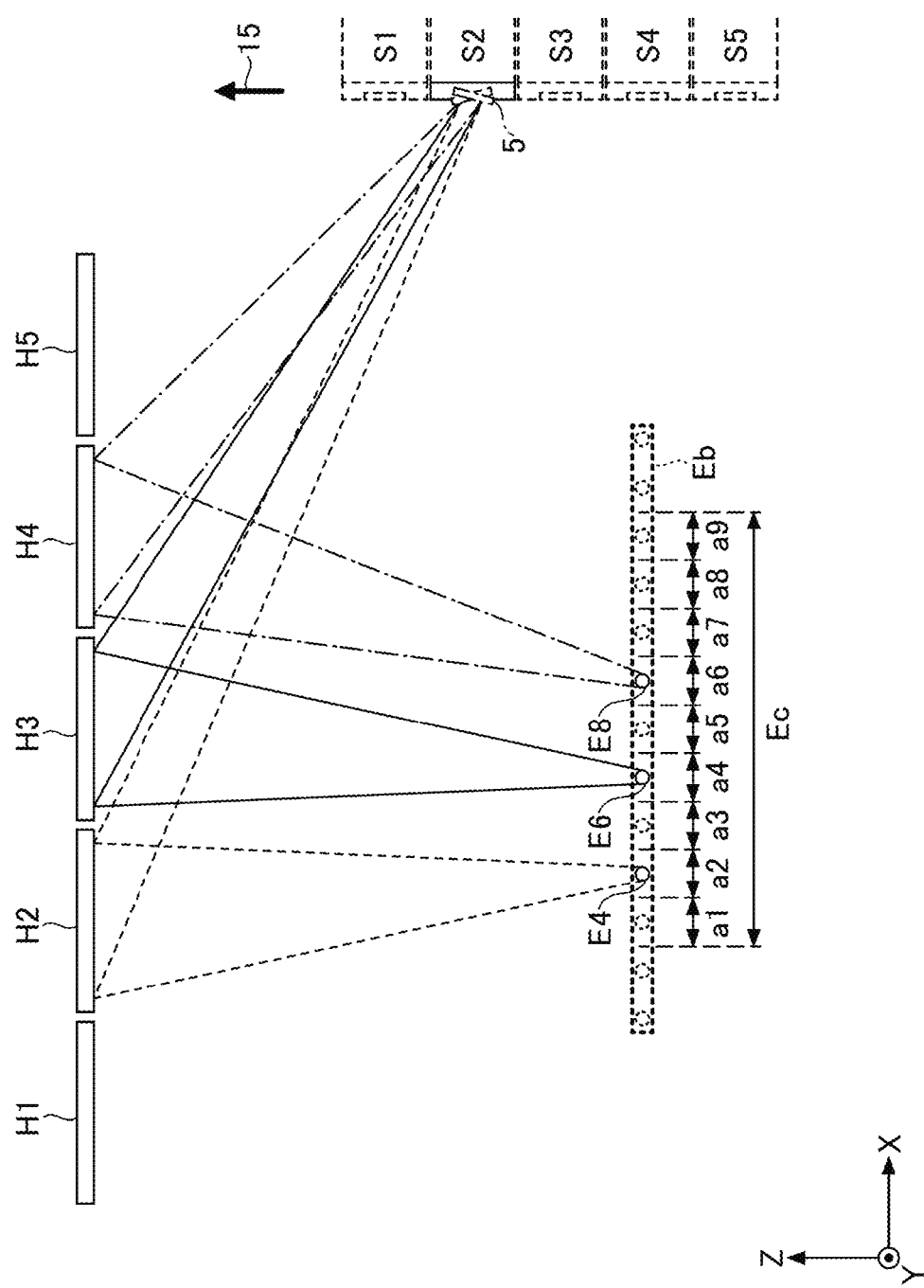

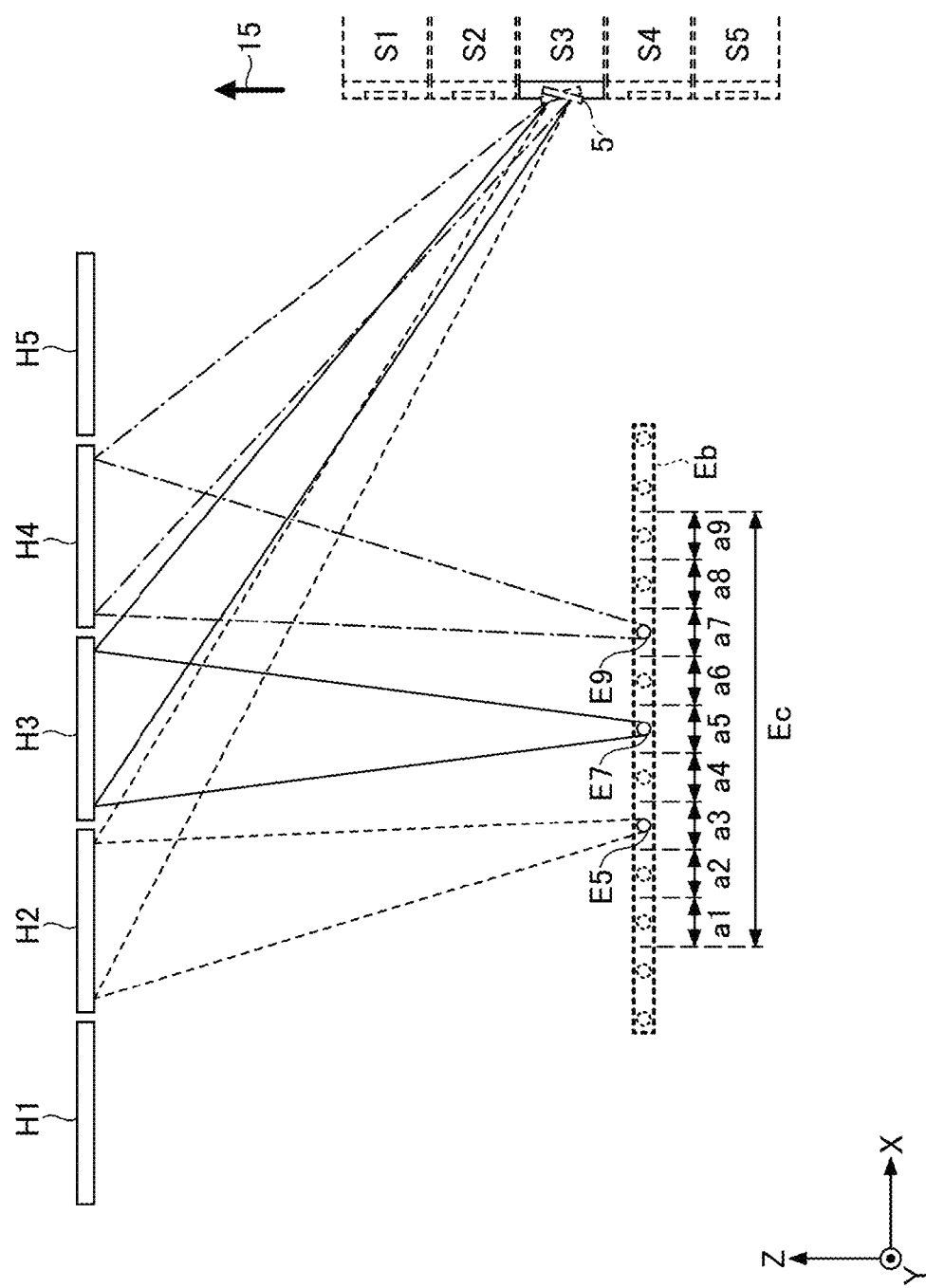

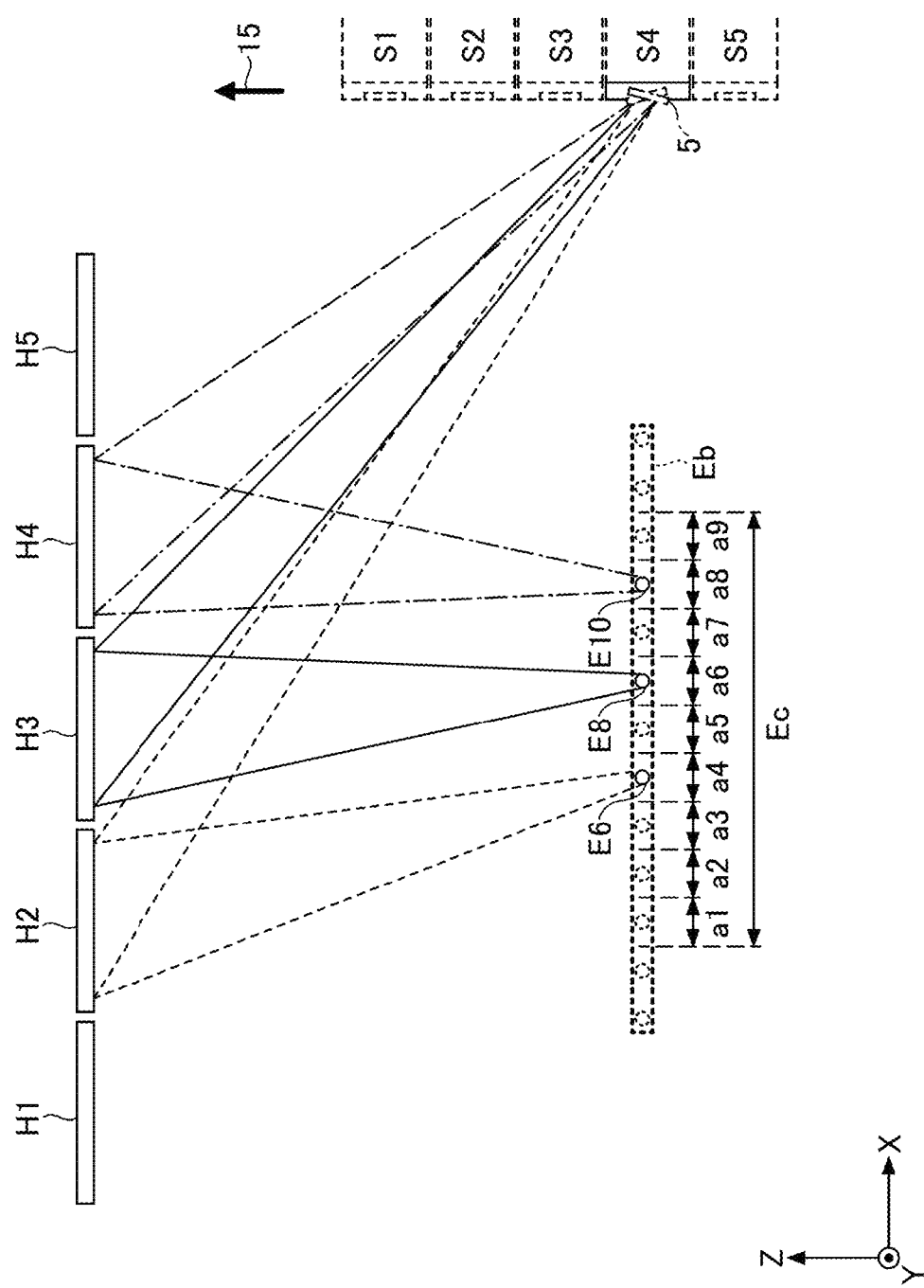

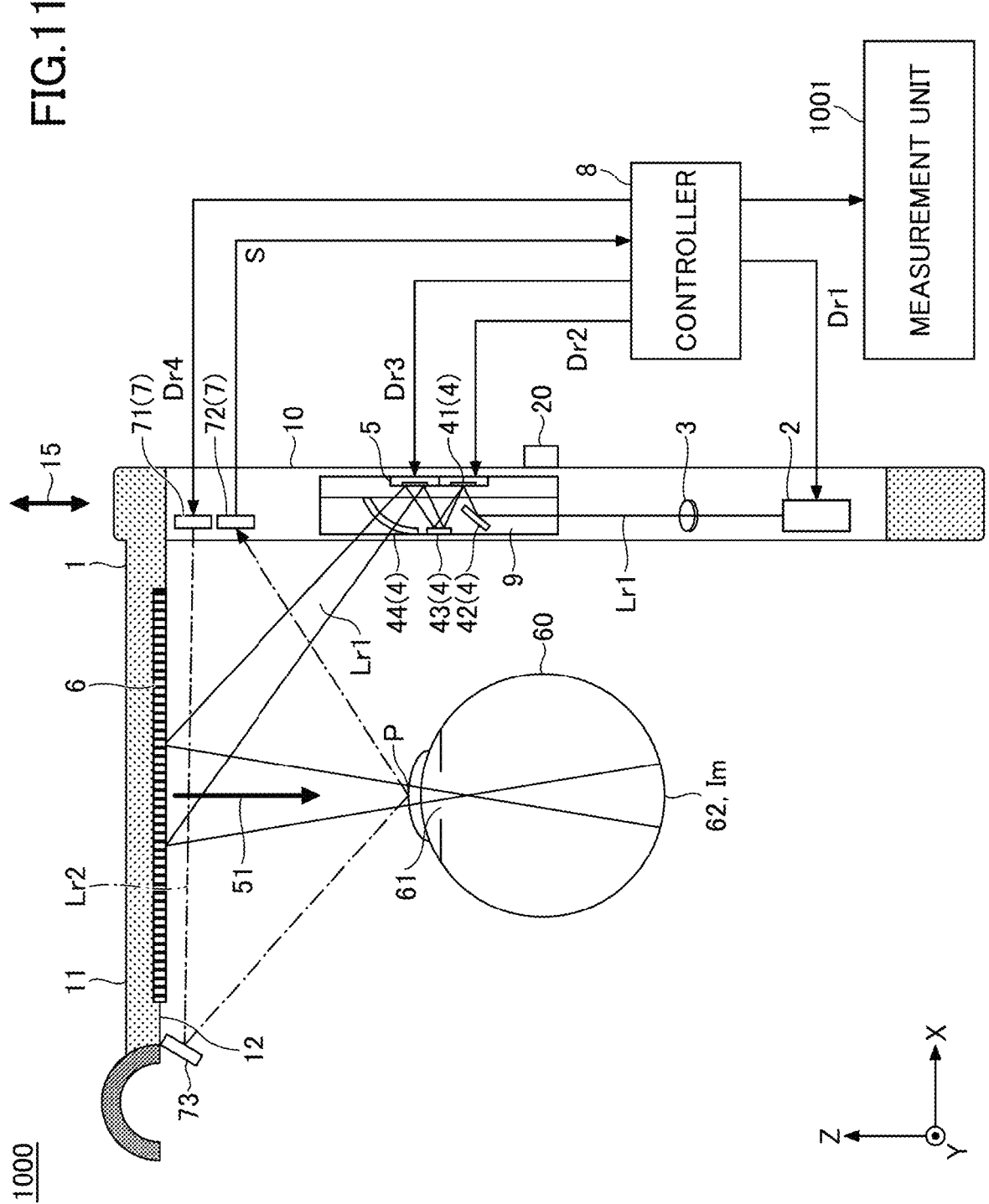

RETINAL PROJECTION DISPLAY DEVICE, HEAD-MOUNTED DISPLAY DEVICE, AND OPTOMETRIC DEVICE

CROSS-REFERENCE TO RELATED APPLICATION

This application is based on and claims priority to Japanese Patent Application No. 2022-158568, filed on Sep. 30, 2022, the entire contents of which are incorporated herein by reference.

BACKGROUND OF THE INVENTION

1. Field of the Invention

The disclosure herein relates to a retinal projection display device, a head-mounted display device, and an optometric device.

2. Description of the Related Art

In recent years, virtual reality (VR) and augmented reality (AR) have been attracting attention. In particular, there are high hopes for AR as technology to augment a user's view of the real world and integrate digital information with the real world. Retinal projection display devices utilized in AR have been developed.

As such a retinal projection display device, a device configured to expand a viewing zone (an eye-box) and including a scanning laser projector, a holographic combiner, and an optical splitter is disclosed (for example, see Patent Document 1). In this device, the optical splitter is controllably switchable to each of N positions and between the N positions.

RELATED-ART DOCUMENTS

Patent Documents

Patent Document 1: Japanese Patent No. 6769974

SUMMARY OF THE INVENTION

According to the present disclosure, it is desirable to provide a retinal projection display device, a head-mounted display device, and an optometric device, in each of which a viewing zone can be expanded.

According to an aspect of the present disclosure, a retinal projection display device for projection of a retinal projection display device for projection of an image onto a retina of a wearer wearing an eyeglass-type support is provided. The retinal projection display device includes the eyeglass-type support including a temple; a light source; an optical scanner disposed in the temple and configured to scan light from the light source so as to form the image; a projector configured to project the image formed by the optical scanner onto the retina; an optical deflector disposed in the temple and configured to change a projection direction of the image formed by the optical scanner; and a translation member configured to translate the optical scanner and the optical deflector in a direction in which the temple extends.

BRIEF DESCRIPTION OF THE DRAWINGS

Other objects and further features of the present invention will be apparent from the following detailed description when read in conjunction with the accompanying drawings, in which:

FIG. 1A is a drawing illustrating an example configuration of a retinal projection display device according to a first embodiment;

FIG. 9A is a first diagram illustrating an example in which the position where an exit pupil is formed is moved in the retinal projection display device of FIG. 1A;

FIG. 9D is a fourth diagram illustrating an example in which the position where an exit pupil is formed is moved in the retinal projection display device of FIG. 1A;

FIG. 9E is a fifth diagram illustrating an example in which the position where an exit pupil is formed is moved in the retinal projection display device of FIG. 1A;

FIG. 9F is a sixth diagram illustrating an example in which the position where an exit pupil is formed is moved in the retinal projection display device of FIG. 1A;

FIG. 11 is a drawing illustrating an example configuration of an optometric device according to an embodiment.

DESCRIPTION OF THE EMBODIMENTS

Figure 1B:
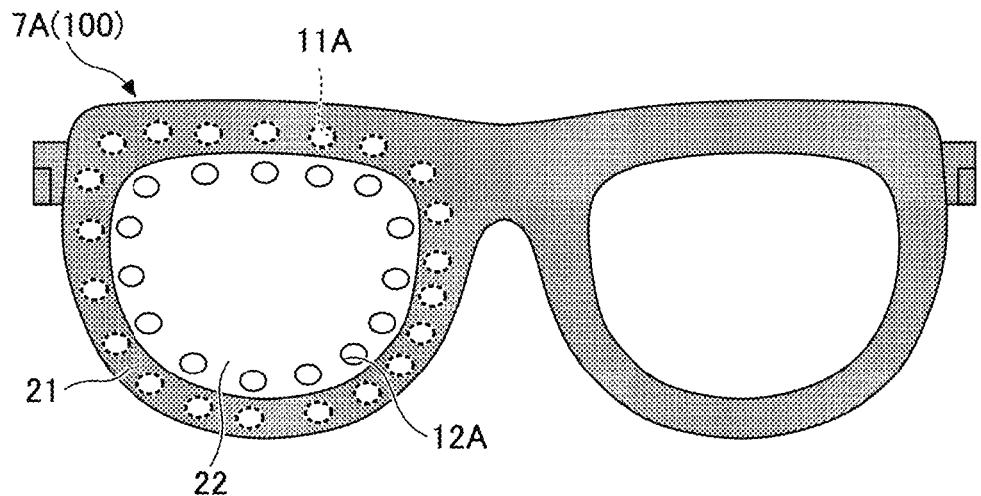
FIG. 1B is a front view of a retinal projection display device including a line-of-sight detector according to another example of the first embodiment.

In the following, a retinal projection display device, a head-mounted display device, and an optometric device according to embodiments of the present disclosure will be described in detail with reference to the accompanying drawings. The following embodiments exemplify the retinal projection display device, the head-mounted display device, and the optometric device to embody the technical idea of the embodiments, and are not limited to the following description. In addition, unless otherwise specified, the dimensions, materials, shapes, relative arrangements, and the like of components described in the embodiments are not intended to limit the scope of the present disclosure thereto, but are described as examples. Further, in the following description, the same names and reference numerals denote the same or similar members, and a detailed description thereof will be omitted as appropriate.

In the drawings, in order to indicate directions, an orthogonal coordinate system having an X-axis, a Y-axis, and a Z-axis may be used. An X-axis direction and a Y-axis direction represent two directions orthogonal to each other in a plane orthogonal to the Z-axis. In the present specification, the term "top view" refers to viewing an object from above. However, these directions are not intended to limit the directions of the retinal projection display device, the head-mounted display device, and the optometric device according to the embodiments of the present invention.

The retinal projection display device according to the embodiments is a retina projection head-mounted display (HMD) that is a wearable device and that uses a Maxwellian view to project an image directly onto the retina of a wearer of the wearable device by laser scanning. In the present specification, the retinal projection display device adopted for the right eye of a person will be described as an example. However, the retinal projection display device according to the embodiments can be adopted for both the left eye and the right eye.

In the present specification, an image includes a still image and a moving image. The moving image may be referred to as a video. Further, in the present specification, a laser ray is synonymous with a laser beam. The laser ray is an example of light from a light source. Further, in the present specification, the term "substantially coincide" is not intended to mean that two objects completely coincide with each other, but is intended to allow for manufacturing and assembly tolerances. The term "substantially parallel" is not intended to mean that two objects are completely parallel to each other, but is intended to allow for manufacturing and assembly tolerances.

First Embodiment

<Overall Configuration of Retinal Projection Display Device 100>

FIG. 1A is a drawing illustrating an example configuration of a retinal projection display device 100 according to a first embodiment. The retinal projection display device 100 includes an eyeglass-type support 1, a light source 2, a lens 3, an optical scanner 4, an optical deflector 5, a projector 6, a line-of-sight detector 7, a controller 8, a translation member 9, and an operation member 20. Note that the lens 3, the line-of-sight detector 7, and the operation member are not essential components of the retinal projection display device 100.

The eyeglass-type support 1 has a shape and appearance of an eyeglass frame. The eyeglass-type support 1 includes a temple 10, a rim 11, and an eyeglass lens 12. The temple 10 is a portion of the eyeglass-type support 1 located near the "temple" of a person wearing the eyeglass-type support 1. The temple 10 extends in an extending direction 15. The extending direction 15 is a direction substantially parallel to the Z-axis, and is a direction substantially parallel to a direction of a line of sight (a direction that the person is facing) when an eye 60 described below is not rotated. The rim 11 holds the eyeglass lens 12. The eyeglass-type support 1 is worn by the person operating the retinal projection display device 100. The person operating the retinal projection display device 100 is a user, a manager, or the like of the retinal projection display device 100. For convenience of description, the person wearing the eyeglass-type support 1 is hereinafter referred to as a "wearer".

The eye 60 represents the eye of the wearer when the wearer is looking straight ahead. The direction of the line of sight of the eye 60 when the wearer is looking straight ahead is parallel to the +Z direction. A pupil 61 represents the pupil of the wearer. A retina 62 represents the retina of the wearer. A region P represents a region of the cornea surface of the eye 60. The retinal projection display device 100 projects an image Im onto the retina 62 through the pupil 61. Note that since the image Im is projected onto the retina 62, the reference numerals of the image Im and the retina 62 are illustrated together in FIG. 1A.

The light source 2, the lens 3, the optical scanner 4, the optical deflector 5, the line-of-sight detector 7, and the controller 8 are disposed inside the temple 10. The projector 6 is provided on the surface of the eyeglass lens 12. The operation member 20 is provided outside the temple 10.

The light source 2 is a semiconductor laser that emits laser beams Lr1 having a single peak wavelength or a plurality of peak wavelengths. Specifically, the light source 2 is configured to include a red semiconductor laser, a green semiconductor laser, a blue semiconductor laser, or the like. The light source 2 emits laser beams Lr1 that have been time modulated in response to a first drive signal Dr1 from the controller 8. If the image Im is a monochrome image, a semiconductor laser that emits laser beams Lr1 having a single peak wavelength is used as the light source 2. If the image Im is a color image, a semiconductor laser that emits laser beams Lr1 having a plurality of peak wavelengths is used as the light source 2.

The light intensity of laser beams Lr1 emitted from the light source 2 is limited to an appropriate light intensity taking into consideration the safety of human eyes. The retinal projection display device 100 may include an optical element that reduces the light intensity of the laser beams Lr1. The retinal projection display device 100 can include at least one photodiode, and use the output of the photodiode to control the light intensity of the laser beams Lr1 so as not to exceed an appropriate light intensity taking into consideration the safety of human eyes. As used herein, the "appropriate light intensity taking into consideration the safety of human eyes" refers to a light intensity below Class 1 under the International Electrotechnical Commission (IEC) 60825-1, which is an international standard relating to the safety of laser light. The light source 2 is not limited to a semiconductor laser, and may be a solid laser, a gas laser, or the like.

The light source 2 may be provided outside the temple 10. The laser beams Lr1 from the light source 2 may be guided from the outside of the temple 10 to the inside of the temple 10.

The lens 3 guides the laser beams Lr1 from the light source 2 to the optical scanner 4.

The optical scanner 4 is disposed in the temple 10, and is configured to scan the laser beams Lr1 from the light source 2 so as to form the image Im. The optical scanner 4 includes an oscillation mirror 41, a first mirror 42, a second mirror 43, and a shaping optical element 44. The optical scanner 4 has a light guide structure that propagates light in the traveling direction of the laser beams Lr1 incident on the optical scanner 4 while folding an optical path. The traveling direction of the laser beams Lr1 incident from the light source 2 onto the optical scanner 4 is substantially parallel to the extending direction 15 of the temple 10. Note that the structure of the optical scanner 4 is not limited to the above structure as long as the optical scanner 4 can scan the laser beams Lr1 from the light source 2 so as to form the image Im. Various modifications are possible depending on the number of times folding the optical path in which the laser beams Lr1 propagates and the desired characteristics of the emitted light beams, for example.

The oscillation mirror 41 is a micro-electromechanical system (MEMS) mirror that oscillates (rotates) about two axes substantially orthogonal to each other. The oscillation mirror 41 oscillates in response to a second drive signal Dr2 from the controller 8. The oscillation mirror 41 includes a reflective mirror on a movable portion coupled to a support substrate. By causing the reflective mirror of the oscillation mirror 41 to oscillate such that the angle of the reflective mirror is changed, the optical scanner 4 can scan the laser beams Lr1 incident on the optical scanner 4 so as to form the image Im on the retina 62.

Pixels in the image Im are rendered continuously in terms of time. A main-scanning direction in which a series of pixel groups in the image Im is formed corresponds to the Z direction at the position of the oscillation mirror 41 and corresponds to the X direction at the position where the laser beams Lr1 are incident on the eye 60. A sub-scanning direction that is orthogonal to the main-scanning direction and in which a series of pixel groups in the image Im are arranged corresponds to the Y direction at both of the position of the oscillation mirror 41 and the position where the laser beams Lr1 are incident on the eye 60. The scanning speed in the main-scanning direction is higher than the scanning speed in the sub-scanning direction.

The oscillation mirror 41 is disposed in an optical path between the light source 2 and the optical deflector 5. The surface of the support substrate of the oscillation mirror 41 is disposed substantially parallel to the extending direction 15. The main-scanning direction at the position of the oscillation mirror 41 is substantially parallel to the extending direction 15. The configuration of the oscillation mirror 41 will be described in detail with reference to FIG. 2.

The oscillation mirror 41 is not limited to a biaxial MEMS mirror, and may be configured to use two uniaxial MEMS mirrors. Instead of the oscillation mirror 41, the optical scanner 4 may use a polygon mirror, a galvano mirror, or the like, or may use a combination of any of the oscillation mirror 41, a polygon mirror, a galvano mirror, and the like. From the viewpoint of reducing the size and the weight of the retinal projection display device 100, it is preferable to use a MEMS mirror as the oscillation mirror 41. In particular, if a biaxial MEMS mirror is used alone, the size and the weight of the retinal projection display device 100 can be reduced. A method of driving a MEMS mirror may be any desired method including an electrostatic method, a piezoelectric method, and an electromagnetic method.

The optical deflector 5 reflects the laser beams Lr1 from the optical scanner 4 toward the projector 6. The optical deflector 5 is disposed in the temple 10, and changes a projection direction 51 in which the image Im formed by the optical scanner 4 is projected by the projector 6.

The optical deflector 5 includes a vector scanning MEMS mirror. The vector scanning MEMS mirror has a reflective surface on a movable portion coupled to a support substrate. The reflective surface of the optical deflector 5 oscillates in response to a third drive signal Dr3 from the controller 8. The optical deflector 5 can selectively change the reflection direction of light by changing the inclination of the reflective surface. The optical deflector 5 is axially rotatable about an axis along the Y-axis. The optical deflector 5 can control the inclination at any position within a movable range in accordance with the third drive signal Dr3.

In addition, the optical deflector 5 is also axially rotatable about an axis along the Z-axis. The optical deflector 5 can control the inclination of the reflective surface at any position within the movable range in accordance with the third drive signal Dr3. The optical deflector 5 can change the projection direction 51 of the image Im formed by the optical scanner 4 along the X direction and the Y direction within the movable range as appropriate. The retinal projection display device 100 can cause the optical deflector 5 to change the projection direction 51 of the image Im formed by the optical scanner 4. Since the projection direction 51 of the image Im can be changed according to the position or the inclination of the wearer's eye 60, the viewing zone of the retinal projection display device 100 can be expanded.

In the present embodiment, the optical deflector 5 is disposed in an optical path between the optical scanner 4 and the projector 6. However, the position where the optical deflector 5 is disposed is not limited to the optical path between the optical scanner 4 and the projector 6, and can be appropriately changed according to the position of the optical scanner 4 or the projector 6 as long as the projection direction 51 of the image Im by the projector 6 can be changed.

The optical deflector 5 is disposed such that the surface of the support substrate is substantially parallel to the extending direction 15. The surface of the support substrate of the oscillation mirror 41 of the optical scanner 4 is substantially coplanar with the surface of the support substrate of the optical deflector 5. That is, the reflective surface of the oscillation mirror 41 in a state in which a drive voltage is not applied is substantially parallel to the reflective surface of the optical deflector 5 in a state in which the drive voltage is not applied. Note that the expression "state in which the drive voltage is not applied" refers to a state in which the drive voltage is not applied and the reflective surfaces of the oscillation mirror 41 and the optical deflector 5 are maintained stationary. By arranging the optical scanner 4 and the optical deflector 5 as described above, the size of the folded light-guide structure can be reduced, and thus, the thicknesses of the optical scanner 4 and the optical deflector 5 can be reduced. By reducing the thicknesses of the optical scanner 4 and the optical deflector 5, the thickness of the temple 10 can be reduced, and thus, the size of the retinal projection display device 100 can be reduced. The configuration of the optical deflector 5 will be described in detail with reference to FIG. 3.

The optical deflector 5 may include two uniaxial MEMS mirrors. From the viewpoint of reducing the size and the weight of the retinal projection display device 100, the optical deflector preferably uses the vector scanning MEMS mirror to change the projection direction 51.

The optical deflector 5 may be configured to use one uniaxial MEMS mirror. In this case, the optical deflector 5 can change the projection direction 51 of the image Im formed by the optical scanner 4 along either the X direction or the Y direction as appropriate. Hologram regions, which will be described later, of the projector 6 are limited to one-dimensionally arranged hologram regions, and the direction in which the viewing zone is expanded is limited to one dimension.

The projector 6 projects the image Im formed by the optical scanner 4 onto the retina 62. The projector 6 includes a holographic optical element that functions to reflect and focus the laser beams Lr1 received from the optical deflector toward the eye 60. The holographic optical element of the projector 6 includes reflective focusing elements. The holographic optical element is composed of at least one holographic film.

In the holographic optical element, l×n=x hologram regions having different focusing properties are optically recorded, where l and n are integers of one or greater and x is an integer of two or greater. For example, when n is 1 (n=1), l is 2 (l=2), and when l is 1 (l=1), n is 2 (n=2). In the present embodiment, an example in which l=5, n=2, and x=10 is indicated; however the present invention is not limited thereto.

Each of the above-described hologram regions reflects the laser beams Lr1 from the optical scanner 4 toward the eye 60 so as to form an exit pupil. As the material of the holographic film, Bayfol (registered trademark) HX available from Bayer MaterialScience AG, or a photopolymer film or the like available in the art can be used. The configuration and effects of the projector 6 will be described later in detail with reference to FIG. 7. The projector 6 may be integrated with the eyeglass lens 12. The eyeglass lens 12 includes a prescription eyeglass lens.

The line-of-sight detector 7 detects the line of sight of the wearer. The line-of-sight detector 7 includes a laser light source 71 for detection and a light detecting element 72.

In response to a fourth drive signal Dr4 from the controller 8, the laser light source 71 emits a laser beam Lr2 for detection toward the cornea of the eye 60. The laser light source 71 may be a light source array that includes a plurality of light emitting parts, such as a vertical cavity surface emitting laser (VCSEL) or a laser diode array (LDA). The peak wavelength of the laser beam Lr2 emitted from the laser light source 71 is preferably within the range of the wavelengths of near-infrared light, which is non-visible light, so as not to inhibit the vision of the wearer. However, the present invention is not limited thereto, and the wavelengths of visible light may be used.

The light detecting element 72 receives the laser beam Lr2 emitted from the laser light source 71, reflected by a reflection element 73, incident on the eye 60, and reflected by the eye 60. The light detecting element 72 outputs a detection signal S according to the intensity of the received laser beam Lr2. The light detecting element 72 includes at least one photodiode. The cornea surface, which corresponds to the surface of the eye 60, is transparent and contains moisture. In general, the cornea surface serving as the surface of the eye 60 has a reflectance of approximately 2% to 4%. The laser beam Lr2 incident on the eye 60 is reflected by the eye 60 in the region P on the cornea surface of the eye 60, and is then incident on the light detecting element 72.

The light detecting element 72 is not limited to those including photodiodes. For example, the light detecting element 72 may include a position sensitive detector (PSD) that is a position detecting element. Further, the light detecting element 72 may receive the laser beam Lr2 and output the detection signal S, by using an imaging element such as a charge-coupled device (CCD) or a complementary metal oxide semiconductor (CMOS) to perform image processing based on the spatial intensity distribution of light incident on the imaging surface.

The laser light source 71 and the light detecting element 72 are provided inside the temple 10, and are located closer to the eyeglass lens 12 than the optical scanner 4 is. However, the line-of-sight detector 7 may be provided outside the temple 10. The line-of-sight detector 7 does not necessarily include the laser light source 71 and the light detecting element 72, and may use various line of sight detection techniques in accordance with the application. In the present embodiment, the projector 6 is provided in a substantially center region of the surface of the eyeglass lens 12. Members of the line-of-sight detector 7, such as the laser light source 71 and the light detecting element 72, may be provided at any positions. If provided outside the temple 10, the members of the line-of-sight detector 7 may be provided at the rim or the eyeglass lens 12 as an example. If provided at the eyeglass lens 12, the members of the line-of-sight detector 7 are preferably provided in a region of the eyeglass lens 12 other than a region where the projector is provided, such that a projection image and the external environment can be visually recognized.

Figure 1C:
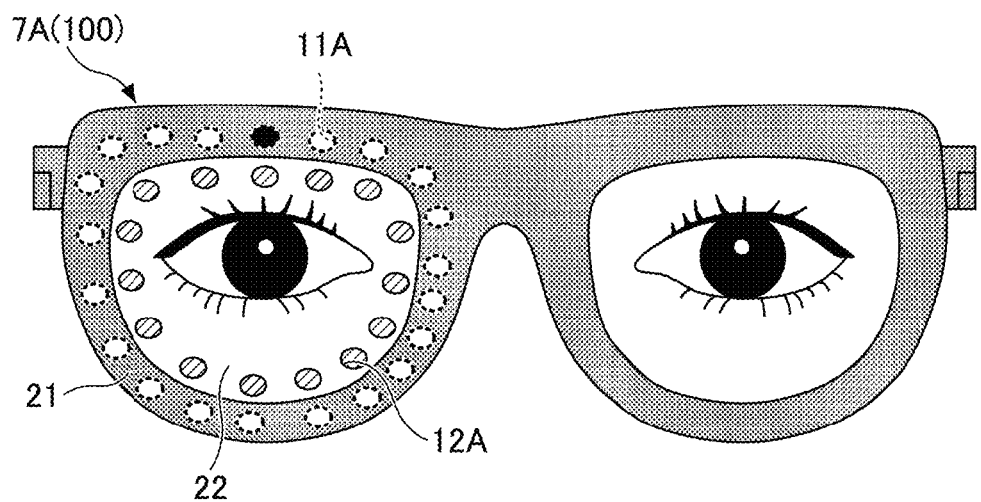
FIG. 1C is a first diagram illustrating an example of detecting the line-of sight direction of a user wearing retinal projection display device of FIG. 1B.
Figure 1D:
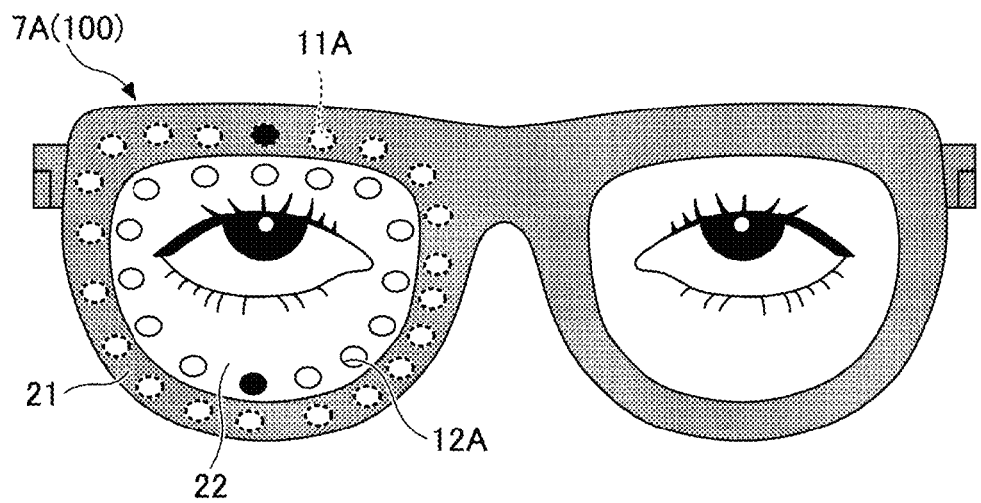
FIG. 1D is a second diagram illustrating an example of detecting the line-of sight direction of the user wearing retinal projection display device of FIG. 1B.

FIG. 1B through FIG. 1D are diagrams illustrating the configuration and the operation of a line-of-sight detector 7A included in a retinal projection display device 100 according to another example of the first embodiment. FIG. 1B illustrates a front view of the retinal projection display device 100 according to this example.

In the retinal projection display device 100 according to this example, one or more LED light sources 11A (configured to emit infrared rays) are arranged on the wearer-face-side of a rim 21 of an eyeglass. Further, a plurality of transparent infrared sensors 12A are formed on the wearer-face-side of a lens 22. The infrared sensors 12A are formed inward of the rim 21 along the rim 21. The LED light sources 11A and the infrared sensors 12A are located on the side facing the wearer's face. In FIG. 1B, only the configuration of the lens 22 on the left side is depicted; however, LED light sources 11A and infrared sensors 12A are also arranged on a lens 22 on the right side of FIG. 1B.

The LED light sources 11A and the infrared sensors 12A are coupled to a control unit disposed in a temple or the like. The control unit controls turning on of the LED light sources 11A. In addition, the control unit acquires output voltages that are output from the infrared sensors 12A upon detection of infrared rays.

The distance between the lens 22 and an eye may be the same as the distance between a lens and an eye in a typical eyeglass. Therefore, as illustrated in FIG. 1B through FIG. 1D, by forming the infrared sensors 12A on the lens 22, the retinal projection display device 100 with less design restrictions can be provided. The infrared sensors 12A are transparent or at least translucent, and thus the user's line of sight is not blocked from the outside world, and the retinal projection display device 100 can be used as an augmented reality (AR) glass. The retinal projection display device 100 can also be used as a virtual reality (VR) glass that blocks the user's line of sight from the outside world.

FIG. 1C is a diagram illustrating an example of detecting the line-of-sight direction of the user wearing the retinal projection display device 100. Turning-on of the light sources 11A and an output voltage of the infrared sensors 12A in a case where the line-of-sight direction is the front direction will be described with reference to FIG. 1C.

It is assumed that the user's eye looks straight ahead. In this case, infrared rays emitted from the LED light sources 11A and reflected by the eye are substantially equally incident on the infrared sensors 12A. Thus, the infrared sensors 12A around the eye output similar output voltages. That is, none of the infrared sensors 12A outputs a particularly large output voltage. This relationship does not change regardless of the position of a LED light source 11A to be turned on. Therefore, if no infrared sensor 12A outputs an output voltage greater than or equal to a threshold, it is estimated that the line-of-sight direction is the front direction.

Conversely, if the line-of-sight direction is the upward direction (the direction of 12 o'clock) as illustrated in FIG. 1D, infrared rays are not equally incident on the infrared sensors 12A, and more infrared rays reflected by the eye tend to be incident on an infrared sensor 12A located in the direction of 6 o'clock. This relationship does not change regardless of the position of a LED light source 11A to be turned on. Therefore, it is estimated that the line-of-sight direction is substantially 180 degrees opposite to an infrared sensor 12A that outputs a large output voltage.

More specifically, based on the line-of-sight directions, patterns can be made in advance indicating from which infrared sensor 12A a large output voltage is detected and in which direction the infrared sensor 12A is located with respect to a LED light source 11A that is turned on, and indicating from which infrared sensor 12A a small output voltage is detected and in which direction the infrared sensor 12A is located with respect to a LED light source 11A that is turned on. In this manner, the user's line-of-sight direction can be estimated.

According to this example, by forming the transparent or translucent infrared sensors 12A on the lens 22, the retinal projection display device 100 with less design restrictions can be provided.

In the example illustrated in FIG. 1A, the controller 8 controls the operation of the optical scanner 4 and the operation of the optical deflector 5. Specifically, the controller 8 outputs the second drive signal Dr2 to the optical scanner 4 to control the scanning of the laser beams Lr1 by the optical scanner 4. Further, the controller 8 outputs the third drive signal Dr3 to the optical deflector 5 to control the inclination of the reflective surface of the optical deflector 5.

The controller 8 can control the operation of the light source 2 based on image data. Specifically, the controller 8 inputs image data, which is the source of the image Im to be projected onto the retina 62, and controls emission of the laser beams Lr1 by the light source 2.

The controller 8 controls emission of the laser beam Lr2 by causing the light emitting parts of the laser light source 71 to be sequentially turned on. Further, the controller 8 estimates the position and the line-of-sight direction of the eye 60 based on the light emission timing of each of the light emitting parts of the laser light source 71 and the detection signal S from the light detecting element 72.

The controller 8 may be provided inside the temple 10. The controller 8 may be provided outside the temple 10, and the drive signals from the controller 8 may be supplied from the outside of the temple 10 to the inside of the temple 10.

The translation member 9 is disposed in the temple 10, and is configured to integrally translate the optical scanner 4 and the optical deflector 5 in the extending direction 15 of the temple 10. The translation member 9 is disposed under (on the −Y side of) the optical scanner 4.

The translation member 9 includes a rack and pinion mechanism. In a state in which the optical scanner 4 and the optical deflector 5 are arranged in the extending direction 15, the optical scanner 4 and the optical deflector 5 are mounted on the rack and pinion mechanism. The rack and pinion mechanism is a mechanism that converts a rotational movement into a linear movement by a rack upon a rotational force being applied to a pinion. The translation member 9 integrally translates the optical scanner 4 and the optical deflector 5 by the rack and pinion mechanism in accordance with an operation performed by the wearer using the operation member 20. Note that components other than the optical scanner 4 and the optical deflector may be mounted on the translation member 9, and the translation member 9 may translate the components.

The translation member 9 is configured to change the positions of the optical scanner 4 and the optical deflector 5 stepwise. The translation member 9 integrally translates the optical scanner 4 and the optical deflector 5 such that the optical scanner 4 and the optical deflector 5 are located at each of a plurality of positions discretely arranged along the extending direction 15. The optical scanner 4 is translated along the extending direction 15 by the translation member 9, and is controllably switchable between N positions. N is an integer of 1 or greater. In the present embodiment, the optical scanner 4 is controllably switchable between N=5 positions; however, the present invention is not limited thereto. The configuration and the operation of the translation member 9 will be described in detail with reference to FIG. 6.

The retinal projection display device 100 can cause the translation member 9 provided in the temple 10 to integrally translate the optical scanner 4 and the optical deflector 5, such that the positions of the optical scanner 4 and the optical deflector 5 can be changed and the projection direction 51 of the image Im formed by the optical scanner 4 can be changed. In this manner, the projection direction 51 of the image Im can be changed in accordance with the position or the inclination of the eye 60 of the wearer. Therefore, the viewing zone of the retinal projection display device 100 can be expanded. Further, in the present embodiment, since the translation member 9 translates the optical scanner 4 and the optical deflector 5 in the extending direction 15, the width of the temple 10 in a direction orthogonal to the extending direction 15 is not required to be increased according to the amount of translation. Therefore, as compared to when the optical scanner 4 and the optical deflector 5 are translated in a direction other than the extending direction 15, the width of the temple 10 in the direction orthogonal to the extending direction 15 can be reduced, and thus, the size of the retinal projection display device 100 can be reduced. Accordingly, in the present embodiment, the retinal projection display device 100 whose size can be reduced while expanding the viewing zone can be provided.

The operation member 20 is configured to operate the translation member 9 so as to change the positions of the optical scanner 4 and the optical deflector 5 in accordance with the position and the inclination of the eye 60 of the wearer. The operation member 20 is coupled to the translation member 9. For example, the operation member 20 is configured with a mechanism such as a pinion, a dial coupled to a pinion via a shaft, or the like. The wearer uses the operation member 20 to manually operate the translation member 9 so as to translate the translation member 9, and as a result, the optical scanner 4 and the optical deflector 5 mounted on the translation member 9 are integrally translated. <Behavior of Laser beams Lr1>

In FIG. 1A, the laser beams Lr1, which are divergent beams emitted from the light source 2, are converted into substantially parallel beams by the lens 3. Note that the lens 3 is not necessarily required when the light source 2 emits substantially parallel beams. Further, the number of lenses 3 may be increased as necessary. The laser beams Lr1, converted into the substantially parallel beams by the lens 3, are incident on the optical scanner 4. The traveling direction of the laser beams Lr1 incident on the first mirror 42 of the optical scanner 4 is substantially parallel to the extending direction 15. Therefore, even when the position of the optical scanner 4 is changed by the translation member 9, the optical characteristics of the laser beams Lr1 after entering the first mirror 42 are not affected.

The laser beams Lr1 reflected by the first mirror 42 are incident on the oscillation mirror 41. The oscillation mirror 41 scans the laser beams Lr1 biaxially. The laser beams Lr1 scanned by the oscillation mirror 41 are reflected by the second mirror 43 and the optical deflector 5, and are then incident on the projector 6. The projector 6 reflects the incident laser beams Lr1 toward the eye 60, thereby forming an exit pupil. If the positions of the pupil 61 and the exit pupil are aligned, the laser beams Lr1 enter the inside of the eye 60 through the pupil 61. The laser beams Lr1 entering the inside of the eye 60 converge once near the center of the pupil 61 by the light focusing function of a hologram region of the projector 6, and then forms an image approximately at a position of the retina 62. The retinal projection display device 100 can project and display the image Im onto the retina 62. Note that the image Im is not necessarily an in-focus image (perfectly focused image) in an optical path other than on the retina 62.

The above-described visual recognition state is generally called the Maxwellian view. The laser beams Lr1 passing through a position near the center of the pupil 61 reaches the retina 62 irrespective of focus adjustment of a crystalline lens. Thus, it is generally understood that the wearer can clearly visually recognize the projected image Im in a focused state even when the wearer adjusts the focus of the eye at any position in the real space. In contrast, in reality, the laser beams Lr1 incident on the eye 60 have a limited diameter although the diameter is small, and thus there is at least some influence by the action of the crystalline lens. Therefore, in the present embodiment, deign is made such that, by the light focusing effects of the optical scanner 4 and the projector 6, the laser beams Lr1 have a diameter from 300 μm or more and 600 μm or less when being incident on the eye 60 and also have an angle of divergence of a positive limited value, that is, become divergent beams. Accordingly, the image Im formed by the laser beams Lr1 scanned by the optical scanner 4 reaches the retina 62 via the projector 6, irrespective of the focus adjustment of the crystalline lens. Thus, the wearer can clearly visually recognize the projected image Im even when the wearer adjusts the focus of the eyes at any position in the real space. In other words, the image formed by the laser beams Lr1 scanned by the optical scanner 4 is visually recognized by the wearer in a focus-free state.

An angle formed by the temple 10 with respect to the rim 11 can be changed as appropriate according to the embodiment. The retinal projection display device 100 can change the current or voltage to be applied to the light source 2, and can change the light intensity of the laser beams Lr1 to be emitted. Accordingly, the brightness of an image can be changed in accordance with the brightness of the surrounding environment in which the retinal projection display device 100 is used.

<Example Configuration of Oscillation Mirror 41>

Figure 2:
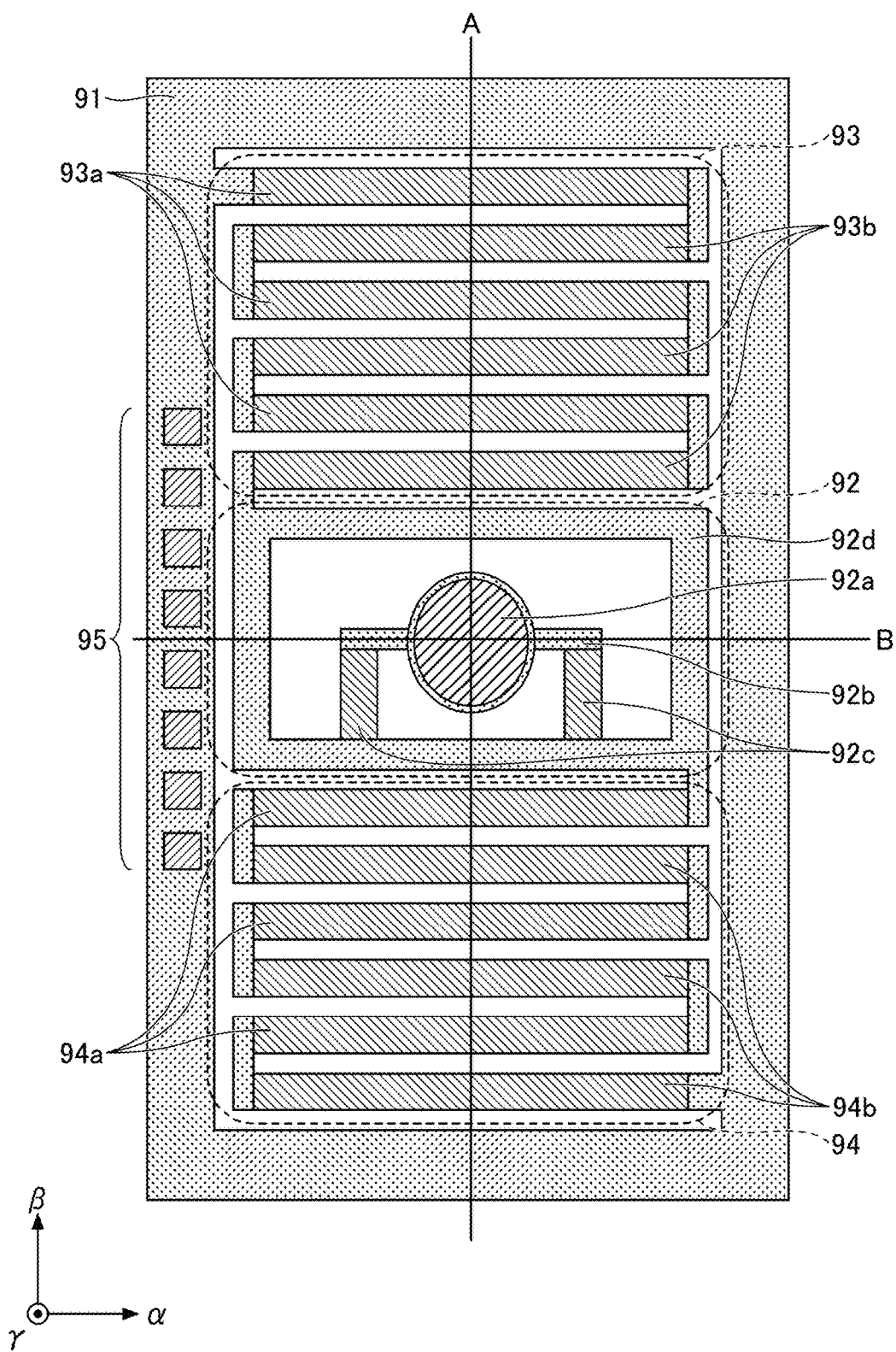
FIG. 2 is a top view of an oscillation mirror included in the retinal projection display device of FIG. 1A.

FIG. 2 is a top view illustrating an example configuration of the oscillation mirror 41. In FIG. 2, directions indicated by arrows are an α direction, a β direction, and a γ direction. The oscillation mirror 41 includes a support substrate 91, a movable portion 92, a meandering beam portion 93, a meandering beam portion 94, and an electrode connection portion 95.

The meandering beam portion 93 is formed in a meandering manner and includes a plurality of turning portions. One end of the meandering beam portion 93 is coupled to the support substrate 91 and the other end of the meandering beam portion 93 is coupled to the movable portion 92. The meandering beam portion 93 includes a beam portion 93a including three beams and a beam portion 93b including three beams. The beams of the beam portion 93a and the beams of the beam portion 93b are alternately formed. Each of the beams included in the beam portion 93a and in the beam portion 93b individually includes a piezoelectric member.

Likewise, the meandering beam portion 94 is formed in a meandering manner and includes a plurality of turning portions. One end of the meandering beam portion 94 is coupled to the support substrate 91 and the other end of the meandering beam portion 94 is coupled to the movable portion 92. The meandering beam portion 94 includes a beam portion 94a including three beams and a beam portion 94b including three beams. The beams of the beam portion 94a and the beams of the beam portion 94b are alternately formed. Each of the beams included in the beam portion 94a and in the beam portion 94b individually includes a piezoelectric member. The number of beams in each of the beam portions 93a and 93b is not limited to three, and may be any number.

Each of the piezoelectric members included in the beam portions 93a, 93b, 94a, and 94b may be provided as a piezoelectric layer in a portion of a layer of each of the beams having a multilayer structure. In the following description, the piezoelectric members included in the beam portions 93a and 94a may be collectively referred to as a piezoelectric member 95a, and the piezoelectric members included in the beam portions 93b and 94b may be collectively referred to as a piezoelectric member 95b.

When voltage signals in opposite phases are applied to the piezoelectric member 95a and the piezoelectric member 95b to flex the meandering beam portion 94, adjacent beam portions are deflected in different directions. As the amount of such deflection is accumulated, a rotational force is generated so as to cause a reflective mirror 92a to oscillate about an A-axis of FIG. 2 in a bidirectional manner.

The movable portion 92 is interposed between the meandering beam portion 93 and the meandering beam portion 94 in the β direction. The movable portion 92 includes the reflective mirror 92a, torsion bars 92b, piezoelectric members 92c, and a support 92d.

The reflective mirror 92a is obtained by forming a metal thin film including aluminum, gold, silver, or the like on a base member by vapor deposition. One end of each of the torsion bars 92b is coupled to the reflective mirror 92a. The torsion bars 92b extend in the +α direction and the −α direction, and rotatably support the reflective mirror 92a.

One end of each of the piezoelectric members 92c is coupled to a corresponding torsion bar 92b, and the other end of each of the piezoelectric members 92c is coupled to the support 92d. Upon a voltage being applied to the piezoelectric members 92c, the piezoelectric members 92c bend and deform, thereby twisting the torsion bars 92b. Twisting of the torsion bars 92b generates a rotational force, and as a result, the reflective mirror 92a rotates about a B-axis.

The rotation of the reflective mirror 92a about the A-axis causes laser beams incident on the reflective mirror 92a to be scanned in the α direction. The rotation of the reflective mirror 92a about the B-axis causes laser beams incident on the reflective mirror 92a to be scanned in the β direction.

The support 92d surrounds the reflective mirror 92a, the torsion bars 92b, and the piezoelectric members 92c. The support 92d is coupled to the piezoelectric members 92c and supports the piezoelectric members 92c. The support 92d indirectly supports the torsion bars 92b coupled to the piezoelectric members 92c, and indirectly supports the reflective mirror 92a.

The support substrate 91 surrounds the movable portion 92, the meandering beam portion 93, and the meandering beam portion 94. The support substrate 91 is coupled to the meandering beam portion 93 and the meandering beam portion 94 so as to support the meandering beam portion 93 and the meandering beam portion 94. In addition, the support substrate 91 indirectly supports the movable portion 92 coupled to the meandering beam portion 93 and to the meandering beam portion 94.

The oscillation mirror 41 is formed by micromachining silicon or glass by using a micromachining technology. By using the micromachining technology, a very small and high precision movable mirror can be formed on a substrate integrally with drive portions such as meandering beam portions.

Specifically, for example, a silicon on insulator (SOI) substrate is formed by etching or the like. A reflective mirror, meandering beam portions, piezoelectric members, an electrode connection portion, and the like are integrally formed on the formed substrate. As a result, a MEMS mirror is obtained. The reflective mirror and the like may be formed after the SOI substrate is formed, or may be formed while the SOI substrate is being formed.

The SOI substrate is a substrate obtained by providing a silicon oxide layer on a silicon support layer made of monocrystal silicon (Si), and further providing a silicon active layer made of monocrystal silicon on the silicon oxide layer. The silicon active layer has a smaller thickness in the γ direction than each of the other dimensions in the α direction and the β direction. With such a configuration, a member made of the silicon active layer functions as an elastic portion having elasticity.

The SOI substrate does not have to be planar, and may have a curvature or the like. As long as the substrate can be integrally formed by etching or the like and can be partially elastic, the member used for forming the MEMS mirror is not limited to the SOI substrate.

<Example Configuration of Optical Deflector 5>

Figure 3:
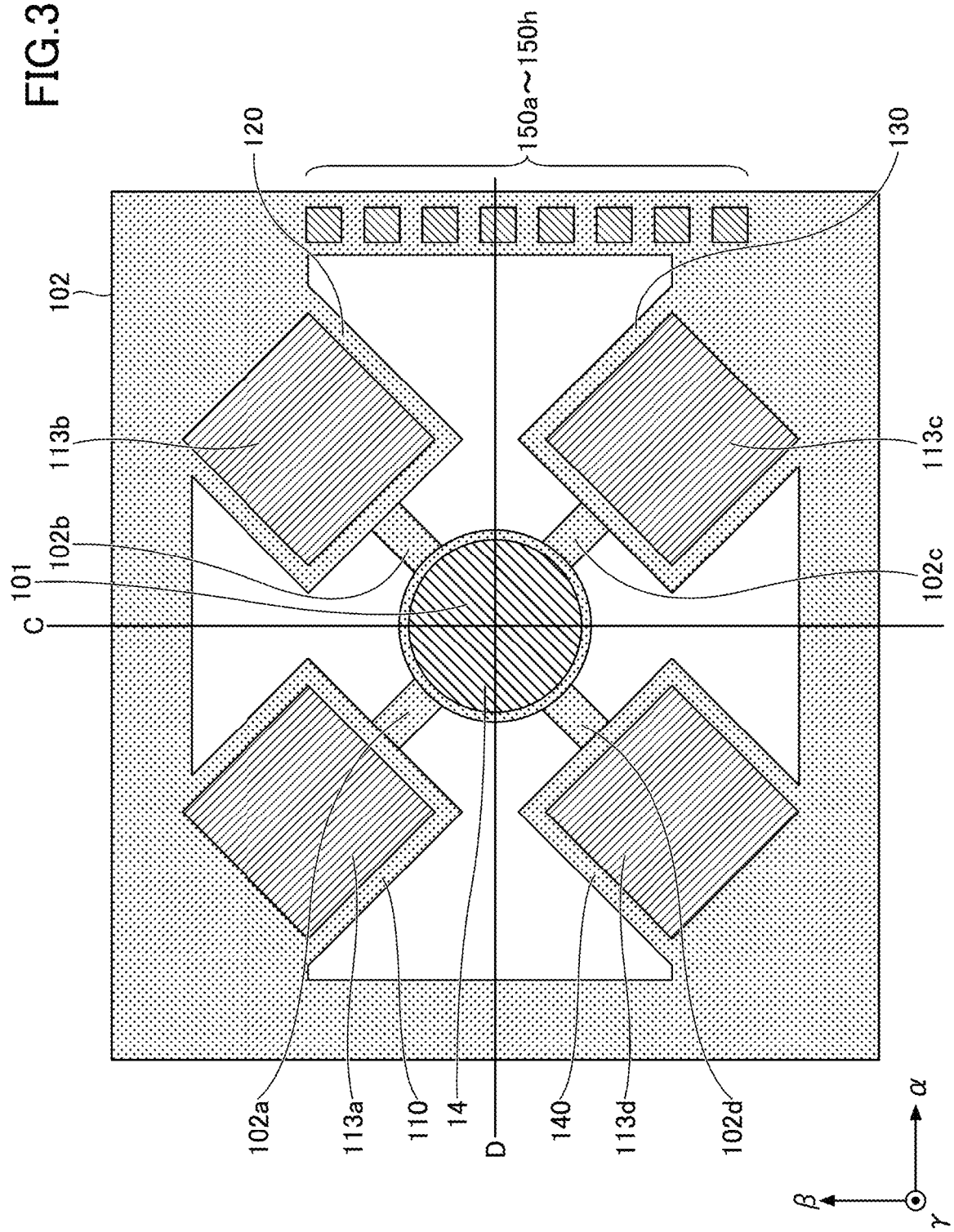
FIG. 3 is a top view of an optical deflector included in the retinal projection display device of FIG. 1A.

FIG. 3 is a top view illustrating an example configuration of the optical deflector 5. In FIG. 3, directions indicated by arrows are an α direction, a β direction, and a γ direction. The optical deflector 5 includes a movable portion 101, piezoelectric drive portions 113a, 113b, 113c, and 113d, a first member 110, a support substrate 102, a connection portion 102a, a connection portion 102b, a connection portion 102c, a connection portion 102d, and electrode connection portions 150a through 150h. The movable portion 101 reflects incident light. The piezoelectric drive portions 113a, 113b, 113c, and 113d are connected to the movable portion 101 and drive the movable portion 101. The support substrate 102 supports a first member 110, a second member 120, a third member 130, a fourth member 140 that respectively include the piezoelectric drive portions 113a, 113b, 113c, and 113d. The connection portion 102a connects the first member 110 to the movable portion 101, the connection portion 102b connects the second member 120 to the movable portion 101, the connection portion 102c connects the third member 130 to the movable portion 101, and the connection portion 102d connects the fourth member 140 to the movable portion 101. The electrode connection portions 150a through 150h electrically connect the piezoelectric drive portions 113a, 113b, 113c, and 113d to the controller 8.

For example, a silicon on insulator (SOI) substrate is formed by etching or the like. A reflective surface 14, the piezoelectric drive portions 113a, 113b, 113c, and 113d, the electrode connection portions 150a through 150h, and the like are integrally formed on the formed substrate. The above components may be formed after the SOI substrate is formed, or may be formed while the SOI substrate is being formed.

The SOI substrate is a substrate obtained by providing a silicon oxide layer on a silicon support layer made of monocrystal silicon (Si), and further providing a silicon active layer made of monocrystal silicon on the silicon oxide layer. The silicon active layer has a smaller thickness in the γ direction than the dimensions in the α direction and the β direction. With such a configuration, a member made of the silicon active layer functions as an elastic portion having elasticity.

The SOI substrate does not have to be planar, and may have a curvature or the like. As long as the substrate can be integrally formed by etching or the like and can be partially elastic, the member used for forming the optical deflector 5 is not limited to the SOI substrate. The reflective surface 14 is composed of, for example, a metal thin film including aluminum, gold, silver, or the like. A rib for reinforcing the movable portion 101 may be formed on the surface on the −Z side of a base of the movable portion 101. The rib may be composed of a silicon support layer and a silicon oxide layer, and can suppress distortion of the reflective surface 14 caused by movement.

The shapes and the configurations of the first member 110, the second member 120, the third member 130, and the fourth member 140 are not particularly limited. For example, the first member 110, the second member 120, the third member 130, and the fourth member 140 may have a meandering structure or a cantilever structure. Further, the first member 110, the second member 120, the third member 130, and the fourth member 140 may include sensors in addition to the piezoelectric drive portions 113a, 113b, 113c, and 113d. The sensors are not particularly limited. Examples of the sensors include displacement sensors (piezoelectric sensors, resistance strain gauges, and the like) that output a signal in response to deformation of a member, temperature sensors, and the like, The shapes of the connection portions 102a, 102b, 102c, and 102d are not limited to those according to the present embodiment. Further, an angle formed by a straight line between the center of the movable portion 101 and each of the centers of the connection portions 102a, 102b, 102c, and 102d is desirably substantially 90 degrees in a plan view; however, the present invention is not limited thereto. Each of the drive portions may have functions other than a drive function. For example, each of the drive portions may have a displacement detection function, a heater, electrical wiring, and the like. Further, the shape of the movable portion is not limited to that according to the embodiment. In FIG. 3, a method of driving the piezoelectric drive portions 113a, 113b, 113c, and 113d is a piezoelectric method, but may be an electromagnetic method in which the electromagnetic field is used to deform a support portion, an electrostatic method in which comb electrodes are provided on the support portion, or a thermoelectric method in which thermal expansion differences between different members are utilized. Further, coils or a magnet array may be formed on the support substrate 102.

Among the above methods, the piezoelectric method is preferable because the drive portions can be effectively disposed, and an increase in the size of the entire optical deflector can be reduced. For example, in the electrostatic method, the comb electrodes are provided at the periphery of the drive portions, and thus, the size of the entire light deflector tends to be increased. Further, in the electromagnetic method, it may be difficult to arrange wires and magnets to define magnetic fields to be applied to the plurality of drive portions through the wires, and the size of the entire optical deflector tends to be increased.

In the present embodiment, the piezoelectric drive portions 113a, 113b, 113c, and 113d using piezoelectric thin films are formed on one surface (on the +Z side) of the silicon active layer serving as the elastic portion. However, the piezoelectric drive portions 113a, 113b, 113c, and 113d may be provided on the other surface (on the −Z side, for example) of the elastic portion, or may be provided on both the one surface (on the +Z side) and the other surface (on the −Z side) of the elastic portion. Further, an insulating layer composed of a silicon oxide film may be formed on at least any of the surface on the +Z side of an upper electrode of each of the piezoelectric drive portions and the surface on the +Z side of the support substrate 102. In this case, electrode wiring is provided on the insulating layer, and the insulating layer is partially removed or is not formed so as to form an opening at a connection spot where the upper electrode, a lower electrode, and the electrode wiring are connected. This configuration increases the degree of flexibility in design of the piezoelectric drive portions 113a, 113b, 113c, and 113d, and the electrode wiring, and also prevents a short circuit due to contact between electrodes.

The silicon oxide film also functions as an anti-reflection member. When a positive or negative voltage in the polarization direction is applied to piezoelectric portions included in the piezoelectric drive portions 113a, 113b, 113c, and 113d, the piezoelectric portions deform (for example, expand and contract) in proportion to the potential of the applied voltage and exhibit inverse piezoelectric effects. The piezoelectric drive portions 113a, 113b, 113c, and 113d bend and deform by the deformation of the piezoelectric portions. As a result, a driving force around a rotation axis (an oscillation axis) acts on the movable portion 101 via the connection portions 102a, 102b, 102c, 102d, and the movable portion 101 moves around a C-axis or a D-axis. The C-axis and the D-axis correspond to rotation axes.

Next, the rotation axes of the present embodiment will be described. The first member 110 is located at approximately 45 degrees with respect to the rotation axis C and the rotation axis D. That is, the rotation of the movable portion 101 by the oscillation of the first member 110, the second member 120, the third member 130, and the fourth member 140 has vectors of both the rotation axis C and the rotation axis D. For example, when a voltage is applied to the piezoelectric drive portions 113a and 113b and no voltage is applied to the piezoelectric drive portions 113c and 113d, the movable portion 101 is inclined about the rotation axis D. Similarly, when a voltage is applied to the piezoelectric drive portions 113a and 113d and no voltage is applied to the piezoelectric drive portions 113c and 113d, the movable portion 101 is inclined about the rotation axis C.

In particular, when a drive frequency that does not coincide with a resonance frequency unique to the structure is used, the rotation direction of the movable portion 101 can be controlled by a drive signal as appropriate. That is, by controlling the driving of the piezoelectric drive portions 113a, 113b, 113c, and 113d in an individual manner or in a combined manner, the movable portion 101 can oscillate in a desired direction, and vector scan can be performed in a rendering region.

In a case where beam portions each has a meandering structure in which beams are connected to be turned, and a piezoelectric drive portion group A and a piezoelectric drive portion group B are alternately provided on the surface on the +Z side of each of the beam portions, a positive or negative deflection angle of the mirror can be controlled without using a negative voltage by driving the piezoelectric drive portion group A alone or the piezoelectric drive portion group B alone. In the above description, the piezoelectric drive portion group A and the piezoelectric drive portion group B are distinguished; however, the piezoelectric drive portion group A and the piezoelectric drive portion group B are collectively referred to as piezoelectric drive portions or drive portions in the present specification.

The reference voltage of the piezoelectric drive portions may be 0 V or may be any voltage up to the maximum amplitude that can be applied. The reference voltage may be different for each of the piezoelectric drive portions. Alternatively, if the piezoelectric drive portions group A and the piezoelectric drive portions group B are provided, the reference voltage may be different between the piezoelectric drive portions group A and the piezoelectric drive portions group B. The waveform of the applied voltage is not particularly limited, and may be a periodic waveform such as a Sin wave, a square wave, a saw tooth wave, or a more complex periodic waveform, or may be a DC drive waveform.

<Example Hardware Configuration of Controller 8>

Figure 4:
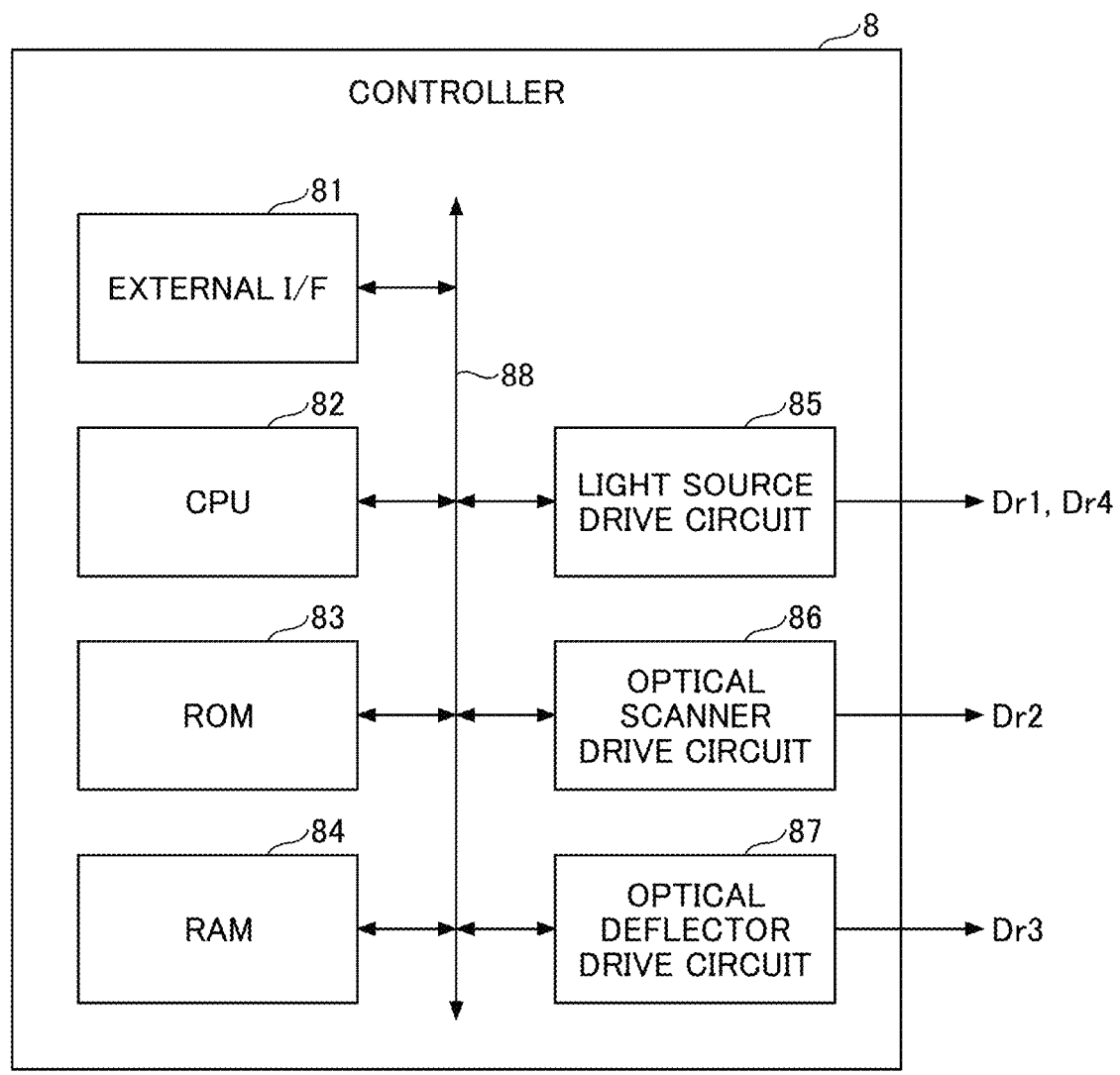
FIG. 4 is a block diagram illustrating an example hardware configuration of a controller included in the retinal projection display device of FIG. 1A.

FIG. 4 is a block diagram illustrating an example hardware configuration of the controller 8. The controller 8 includes an external interface (I/F) 81, a central processing unit (CPU) 82, a read-only memory (ROM) 83, a random-access memory (RAM) 84, a light source drive circuit 85, an optical scanner drive circuit 86, and an optical deflector drive circuit 87. These components are electrically coupled to one another via a system bus 88.

The CPU 82 is an arithmetic device that loads a program or data from a storage device such as the ROM 83 into the RAM 84, and executes processes to control the entire controller 8 or implement functions. The RAM 84 is a volatile storage device that temporarily stores a program and data. The ROM 83 is a non-volatile storage device that stores a program or data even after the power is turned off. The ROM 83 stores a processing program or data that is executed by the CPU 82 to control each function of the retinal projection display device 100.

The external I/F 81 is an interface for connecting the controller 8 with an external device, a network, and the like. Examples of the external device include a host device such as a personal computer (PC), and storage devices such as a USB memory, an SD card, a CD, a DVD, an HDD, and an SSD. For example, the network may be a controller area network (CAN) of a vehicle, a local area network (LAN), the Internet, or the like. The external I/F 81 can have any configuration that enables connection or communication with an external device. The external I/F 81 may be provided for each external device.

The light source drive circuit 85 is an electric circuit that is electrically coupled to the light source 2 and the laser light source 71, and applies a current or a voltage to the light source 2 to drive the light source 2. The light source 2 turns on or off the emission of the laser beams Lr1 or changes the light intensity of the laser beams Lr1 to be emitted in accordance with the first drive signal Dr1 output from the light source drive circuit 85. The laser light source 71 turns on or off the emission of the laser beam Lr2 or changes the light intensity of the laser beam Lr2 to be emitted in accordance with the fourth drive signal Dr4 output from the light source drive circuit 85.

The optical scanner drive circuit 86 is an electric circuit that is electrically coupled to the oscillation mirror 41 and applies a voltage to the oscillation mirror 41 to drive the oscillation mirror 41. The oscillation mirror 41 changes the oscillation angle of the reflective mirror 92a included in the movable portion 92 in accordance with the second drive signal Dr2 output from the optical scanner drive circuit 86.

The optical deflector drive circuit 87 is an electric circuit that is electrically coupled to the optical deflector 5 and applies a voltage to the optical deflector 5 to drive the optical deflector 5. The optical deflector 5 changes the inclination angle of the reflective surface included in the movable portion in accordance with the third drive signal Dr3 output from the optical deflector drive circuit 87.

In the controller 8, the CPU 82 acquires image data from an external device or a network via the external I/F 81. The CPU 82 may have any configuration as long as image data can be acquired. The CPU 82 may be configured to store image data in the ROM 83 in the controller 8. A storage device such as a SD card may be additionally provided in the controller 8, and image data may be stored in the storage device.

The controller 8 can implement functions described below by operating the components of the hardware configuration illustrated in FIG. 4 in accordance with instructions from the CPU 82.

<Example Functional Configuration of Controller 8>

Figure 5:
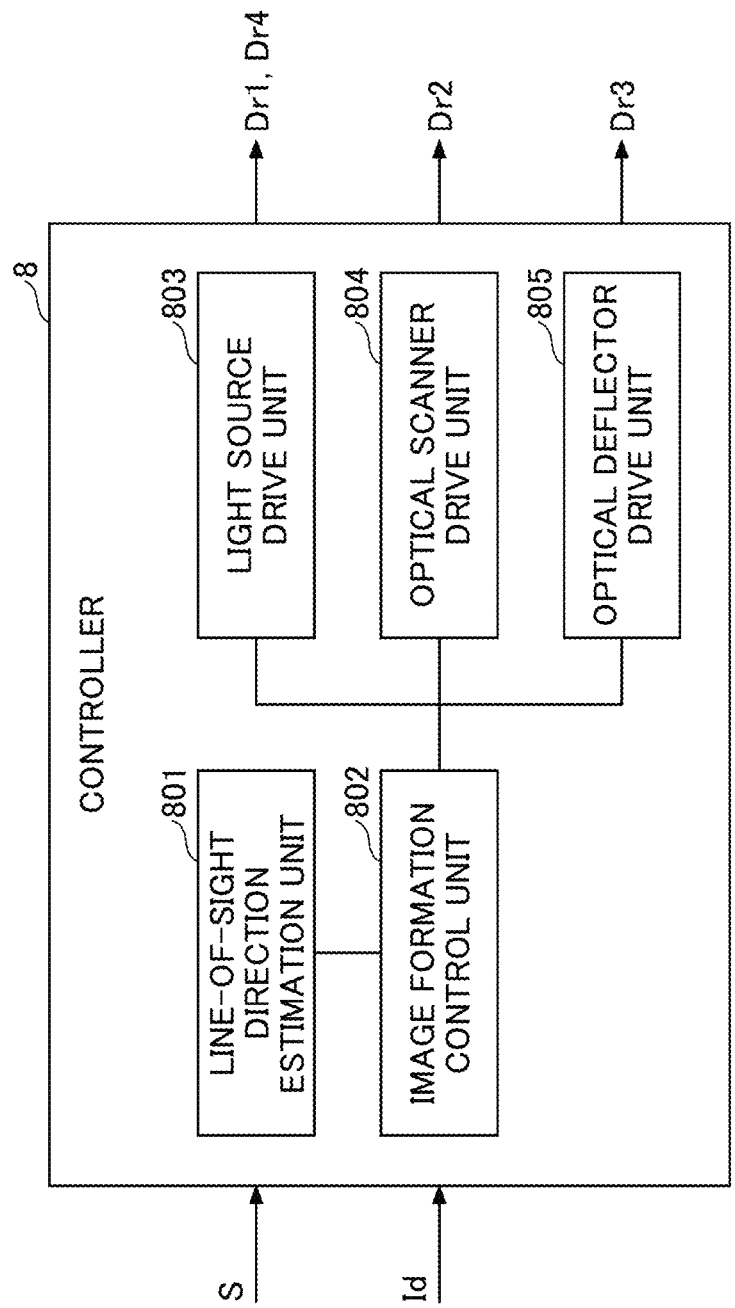
FIG. 5 is a block diagram illustrating an example functional configuration of the controller included in the retinal projection display device of FIG. 1A.

FIG. 5 is a block diagram illustrating an example functional configuration of the controller 8. The controller 8 includes the functions of a line-of-sight direction estimation unit 801, an image formation control unit 802, a light source drive unit 803, an optical scanner drive unit 804, and an optical deflector drive unit 805. Among them, the respective functions of the line-of-sight direction estimation unit 801 and the image formation control unit 802 are implemented by the CPU 82 executing a predetermined program.

The line-of-sight direction estimation unit 801 estimates the position and the line-of-sight direction of the eye 60 based on the light emission timing of each of the light emitting parts of the laser light source 71 and the detection signal S from the light detecting element 72.

The image formation control unit 802 acquires image data Id from an external device, converts the image data Id into a control signal based on a field of view of the wearer, estimated by the line-of-sight direction estimation unit 801, and outputs the control signal to the light source drive unit 803, the optical scanner drive unit 804, and the optical deflector drive unit 805. If the image Im to be visually recognized by the wearer has a distortion or the like, the image formation control unit 802 may perform control to correct the distortion or the like.

The light source drive unit 803 is implemented by the light source drive circuit 85 and the like, and drives the light source 2 or the laser light source 71 based on the control signal from the image formation control unit 802. The optical scanner drive unit 804 is implemented by the optical scanner drive circuit 86 and the like, and drives the oscillation mirror 41 based on the control signal from the image formation control unit 802. The optical deflector drive unit 805 is implemented by the optical deflector drive circuit 87 and the like, and drives the optical deflector 5 based on the control signal from the image formation control unit 802.

<Example Configuration of Translation Member 9>

Figure 6:
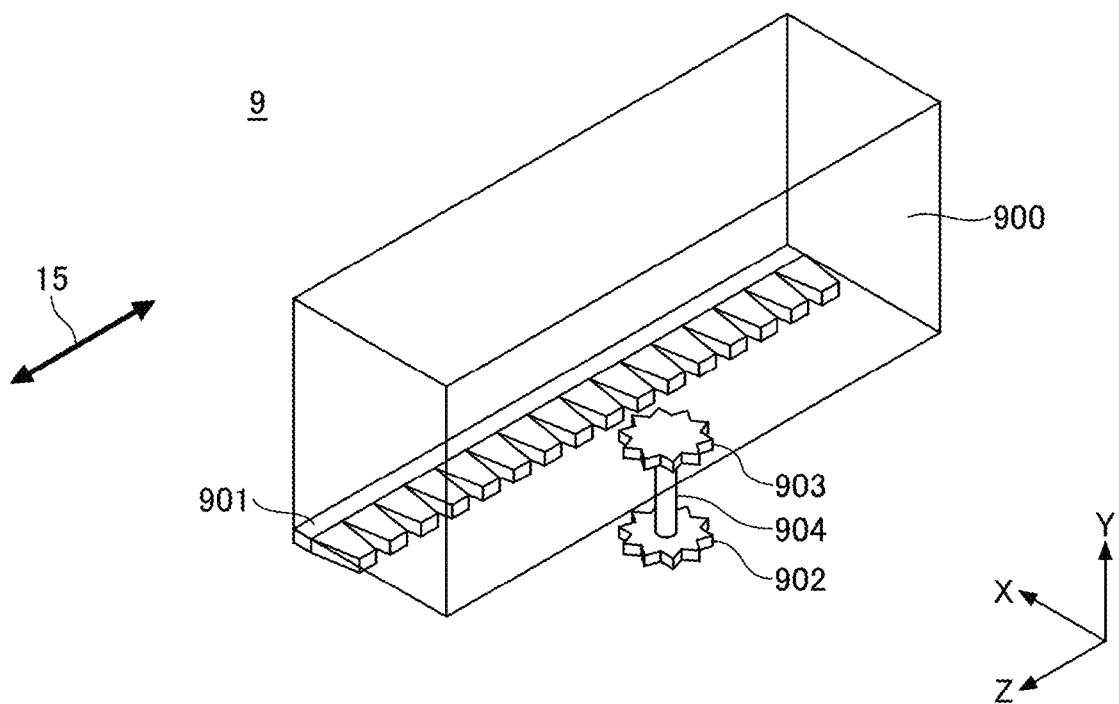
FIG. 6 is a perspective view illustrating an example configuration of a translation member included in the retinal projection display device of FIG. 1A.

FIG. 6 is a perspective view illustrating an example configuration of the translation member 9. The translation member 9 includes a housing 900, a rack 901, a first pinion gear 902, a second pinion gear 903, and a shaft 904. The optical scanner 4 and the optical deflector 5 are housed within the housing 900. In the translation member 9, upon a rotational force being applied to the first pinion gear 902 and the second pinion gear 903, the rotational movement of the first pinion gear 902 and the second pinion gear 903 is converted into a translational movement by the rack 901.

The translation member 9 can switch between positions stepwise. The translation direction of the translation member 9 is substantially parallel to the extending direction 15. The translation member 9 is configured with the rack and pinion mechanism, and thus, the translation member 9 can be compactly mounted in the retinal projection display device 100.

In the present embodiment, the optical scanner 4 is translated along the extending direction 15 by the translation member 9, and the optical scanner 4 is switchable between five positions by the wearer performing a manual operation. For example, the first pinion gear 902, which is coupled, via the shaft 904, to the second pinion gear 903 engaged with the rack 901, may serve as the operation member 20. By providing the operation member 20 outside the temple 10, the wearer can operate the operation member 20 manually.

The translation member 9 may be an electric actuator that combines a rack and pinion mechanism and a motor. Further, the translation member 9 may be configured to be electrically driven in accordance with a drive signal from the operation member 20. Further, the translation member 9 may be configured to be automatically driven based on the line-of-sight direction estimated by the line-of-sight direction estimation unit 801.

<Example Configuration of Projector 6>

Figure 7:
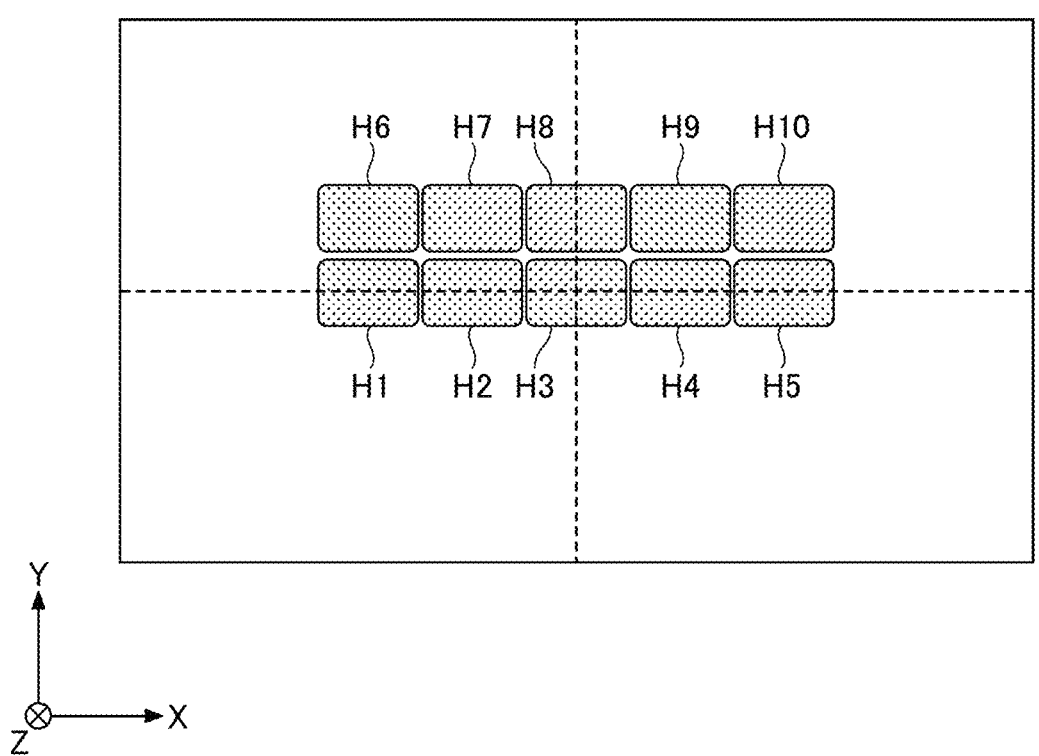
FIG. 7 is a diagram illustrating an example configuration of a projector included in the retinal projection display device of FIG. 1A.

FIG. 7 is a diagram illustrating an example configuration of the projector. The projector 6 includes a holographic optical element. The projector 6 includes X=10 separated hologram regions, that is, hologram regions H1 to H10. The hologram regions H1 to H10 correspond to a plurality of separated projectable regions. The holographic optical element of the projector 6 includes reflective focusing elements in correspondence with the hologram regions H1 to H10.

The hologram regions H1 to H10 function as respective volumetric holograms. Each of the hologram regions H1 to H10 reflects and focuses light, incident under predetermined incident conditions, toward a predetermined position. The predetermined incident conditions are conditions relating to the position and the direction of incident light, and are defined for each of the hologram regions H1 to H10.

The projector 6 reflects light having a plurality of wavelengths. The projector 6 may be composed of one layer of wavelength-multiplexed holographic film when focusing light. Alternatively, the projector 6 may be composed by laminating a plurality of holographic film layers whose bandwidths each includes a plurality of wavelengths of light to be reflected and focused. Alternatively, angle-multiplexed holograms may be used.

In the present embodiment, the projector 6 may include a liquid crystal having the same functions as the holographic optical element, a surface-relief diffractive optical element, or the like. The pattern of the hologram regions H1 to H10 in FIG. 7 is an illustrative example, and differs from the actual pattern.

<Examples of Operation of Projector 6>

Figure 8A:
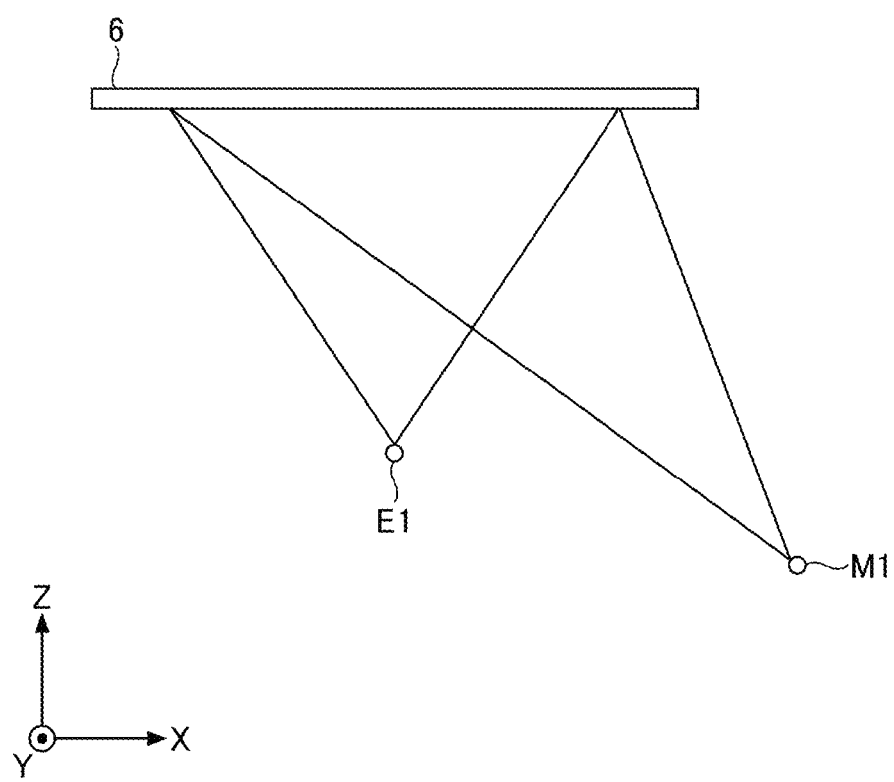
FIG. 8A is a first diagram illustrating an example of the operation of the projector included in the retinal projection display device of FIG. 1A.
Figure 8B:
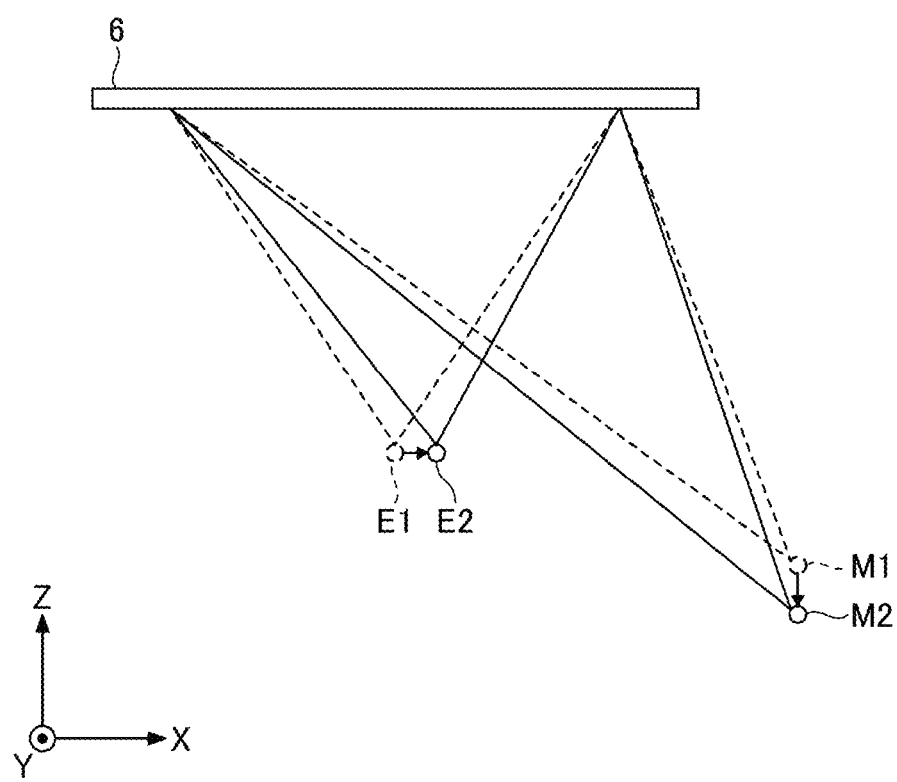
FIG. 8B is a second diagram illustrating an example of the operation of the projector included in the retinal projection display device of FIG. 1A.
Figure 8C:
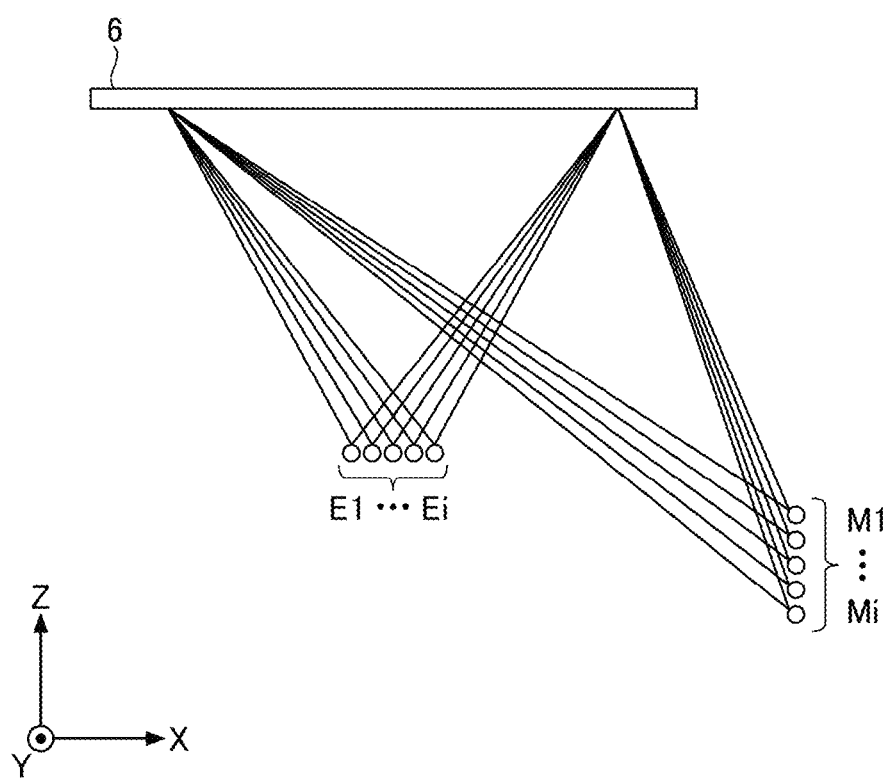
FIG. 8C is a third diagram illustrating an example of the operation of the projector included in the retinal projection display device of FIG. 1A.

FIG. 8A through FIG. 8C are diagrams illustrating examples of the operation of the projector 6. FIG. 8A is a diagram illustrating effects of the projector 6. FIG. 8B is a diagram illustrating a state in which the position where an exit pupil formed by the projector 6 is moved. FIG. 8C is a diagram illustrating a state in which the position where an exit pupil formed by the projector 6 is moved.

As illustrated in FIG. 8A, each of the hologram regions H1 to H10 included in the projector 6 functions to reflect and focus light, incident under the predetermined incident conditions, toward the predetermined position. For example, when image light L1 emitted from an emission region M1 satisfies the incident conditions, the image light reflected by any of the hologram regions H1 to H10 is focused, and an exit pupil E1 is formed. As used herein, the "image light" refers to light that reaches the retina 62 to form the image Im on the retina 62.

In general, a volumetric hologram provides maximum diffraction efficiency for light having a constant incident angle and wavelength or for phase-matched light. In addition, the incident conditions have a certain degree of tolerance for an incident angle or a wavelength. The volumetric hologram reflects and focuses light within the certain degree of tolerance for an incident angle or a wavelength without excessive efficiency degradation. Therefore, as illustrated in FIG. 8B, within the certain degree of tolerance, by moving a light emission point from the emission region M1 to an emission region M2 and changing the incident angle of image light to be incident on any of the hologram regions H1 to H10, the position of an exit pupil can be moved, that is, the exit pupil E1 can be switched to an exit pupil E2. As illustrated in FIG. 8C, the incident angle of the image light to be incident on any of the hologram regions H1 to H10 can be controlled with the certain degree of tolerance of the incident conditions under which the hologram regions H1 to H10 function as the volumetric holograms. For example, by moving the light emission point to any of emission regions M1 to Mi, the position of an exit pupil can be moved. Note that i is an integer of 1 or greater and can be set as appropriate.

Each of the emission regions M1 to Mi is, for example, a virtual emission region that changes in accordance with the position of the optical deflector 5, switched between N positions by the translation member 9, and the inclination of the reflective surface of the optical deflector 5. Exit pupils E1 to Ei are, for example, i regions located at different positions within a predetermined region EC of an eye-box where the eye 60 is positioned. When the emission regions M1 to Mi are not distinguished, the emission regions M1 to Mi are collectively referred to as emission regions M. When the exit pupils E1 to Ei are not distinguished, the exit pupils E1 to Ei are collectively referred to as exit pupils E.

The projector 6 reflects light having a predetermined wavelength band that is very narrow as compared to the wavelength band of visible light, and transmits light having a wavelength band other than the predetermined wavelength band. Therefore, a major portion of light traveling from the real space toward the wearer's eye 60 is transmitted through the projector 6 and incident on the eye 60.

<Examples in which Position where Exit Pupil is Formed is Moved>

Figure 9B:
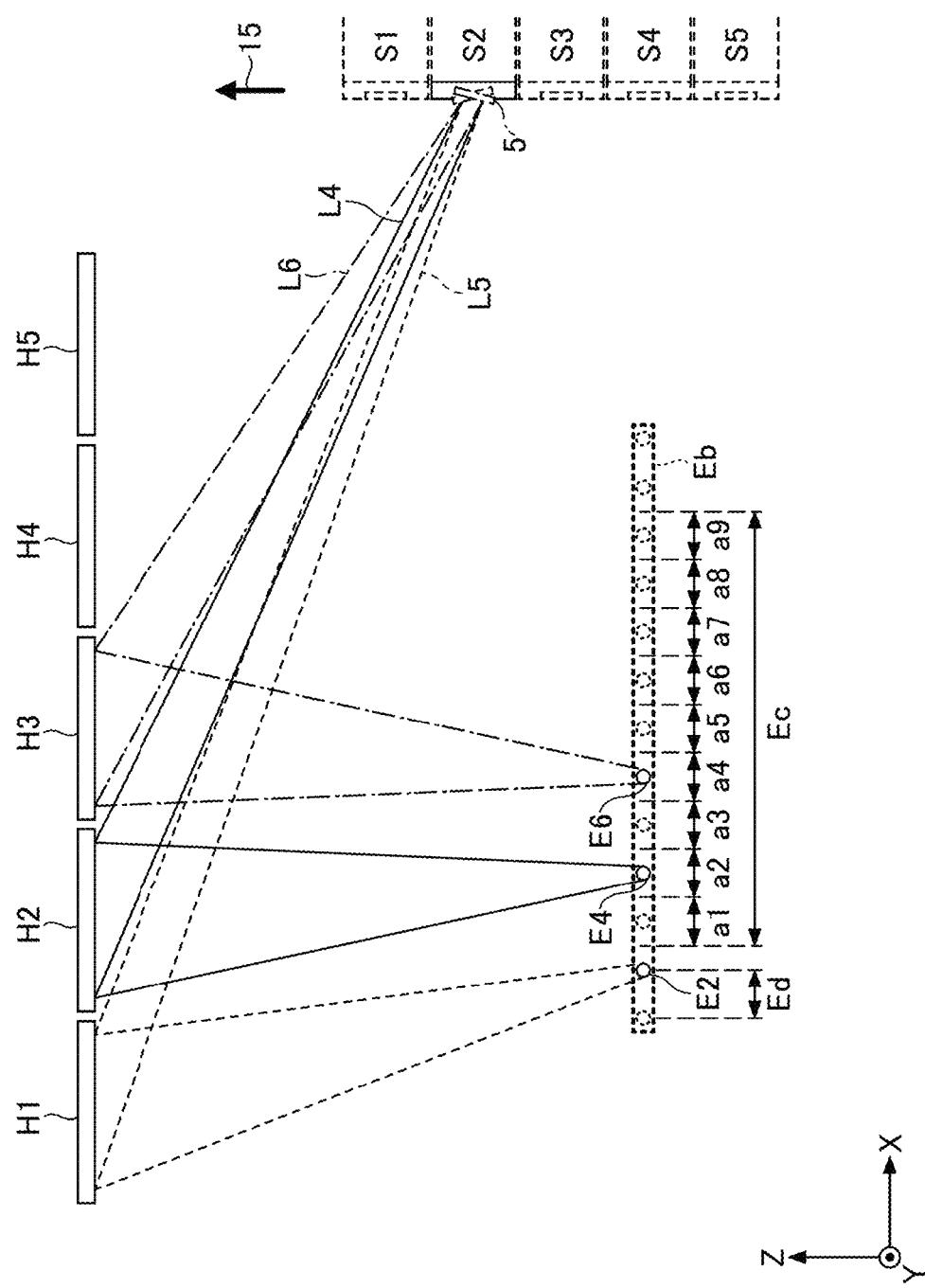
FIG. 9B is a second diagram illustrating an example in which the position where an exit pupil is formed is moved in the retinal projection display device of FIG. 1A.
Figure 9C:
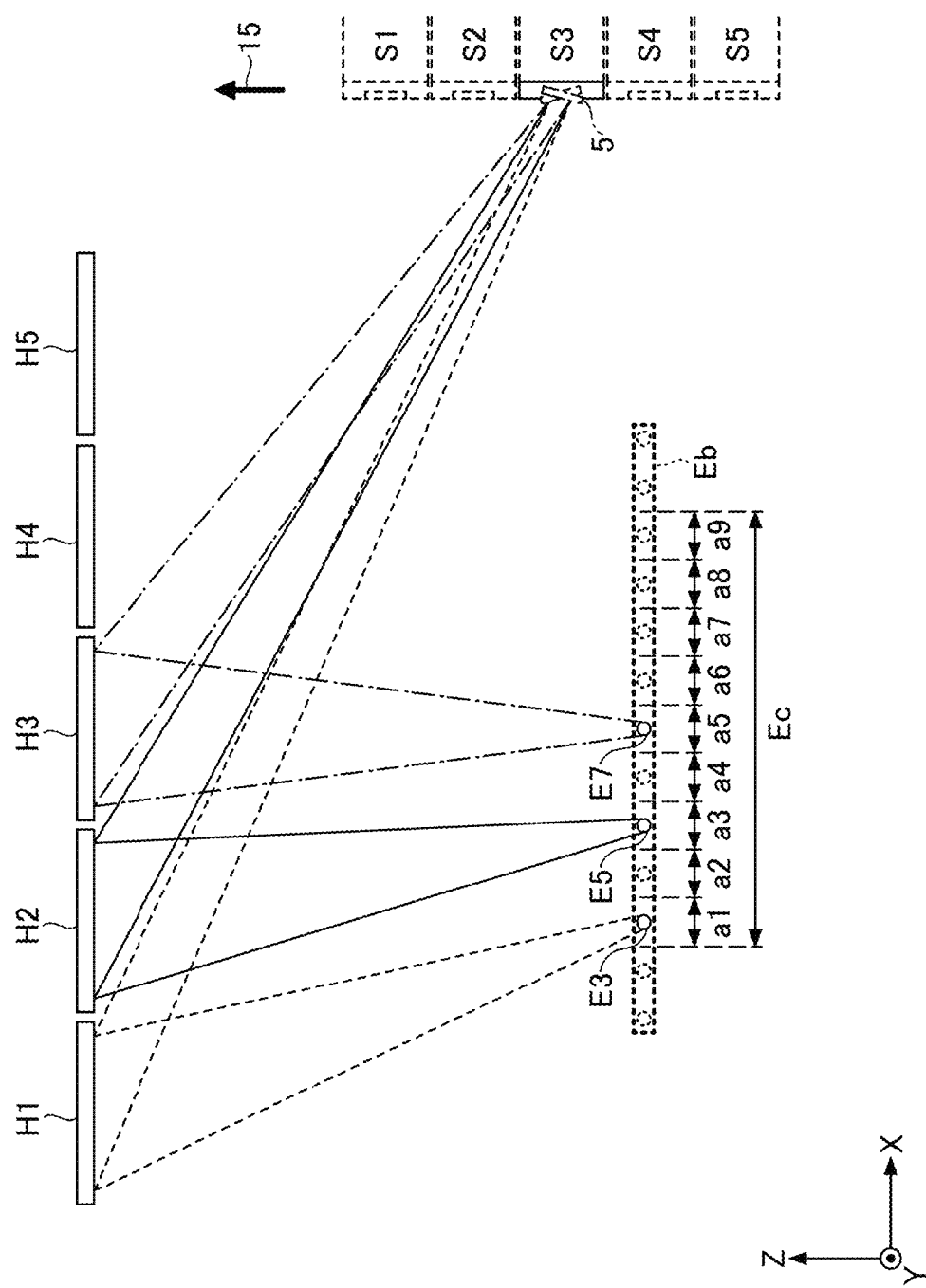
FIG. 9C is a third diagram illustrating an example in which the position where an exit pupil is formed is moved in the retinal projection display device of FIG. 1A.
Figure 9G:
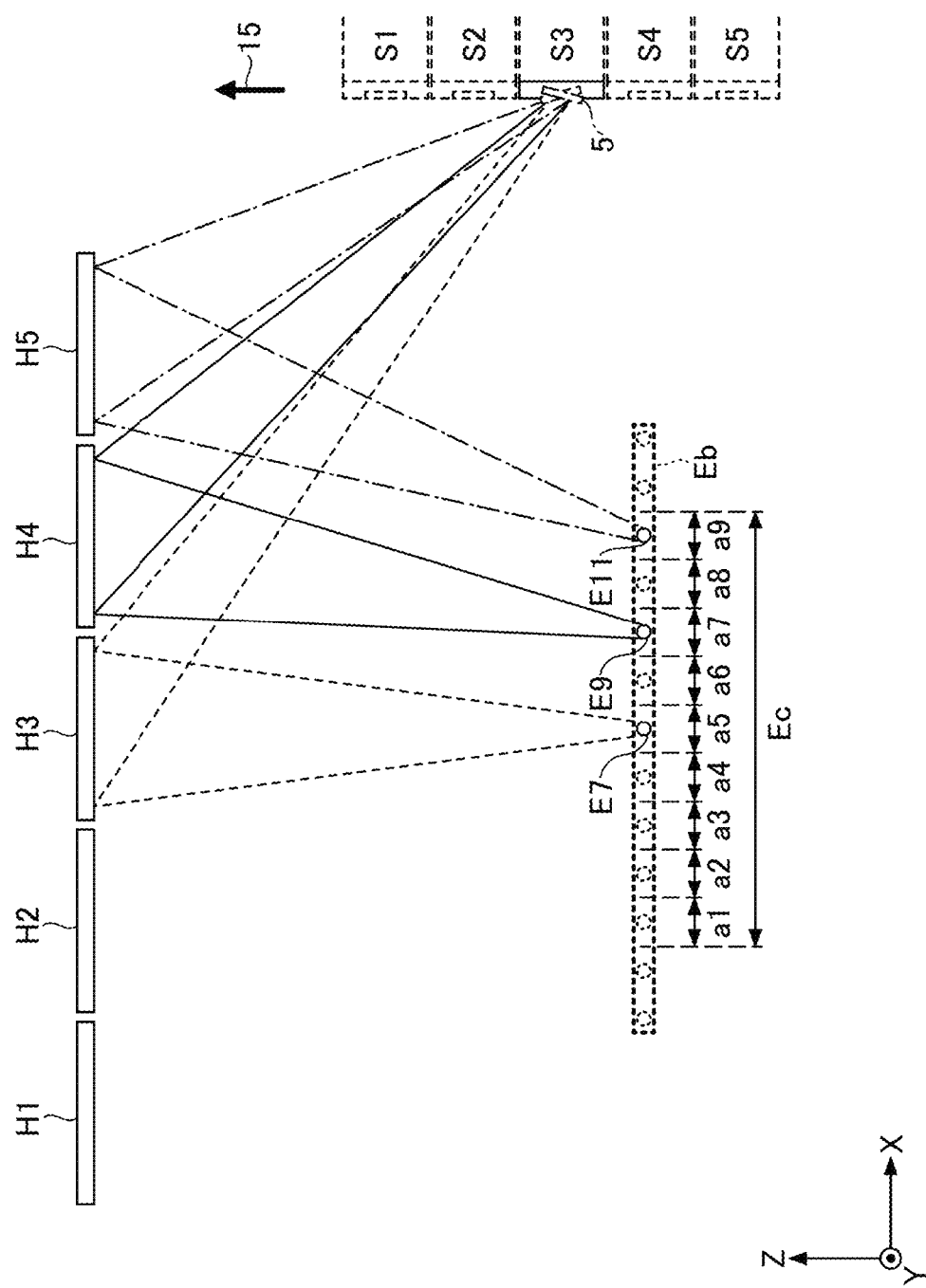
FIG. 9G is a seventh diagram illustrating an example in which the position where an exit pupil is formed is moved in the retinal projection display device of FIG. 1A.
Figure 9H:
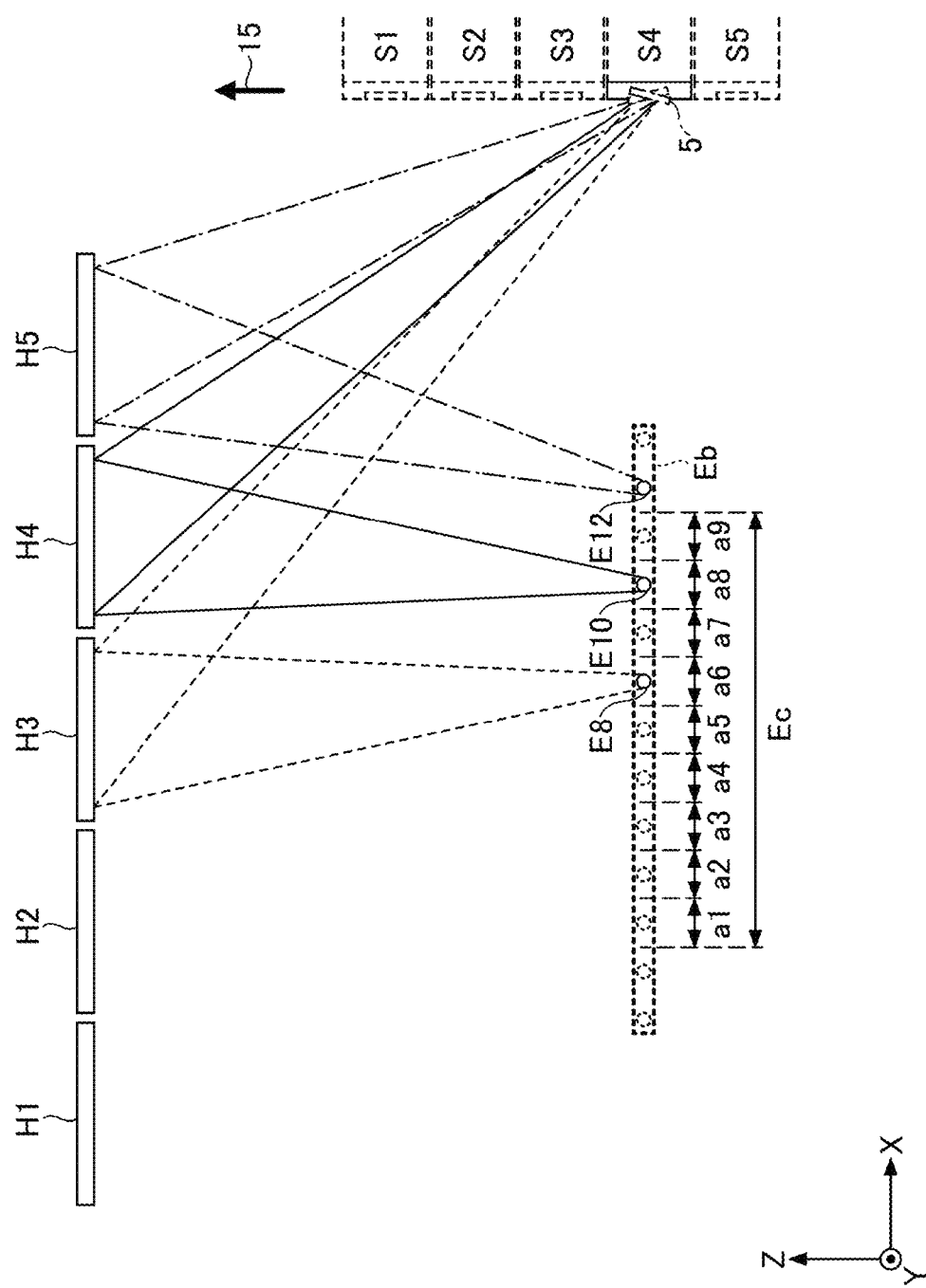
FIG. 9H is an eighth diagram illustrating an example in which the position where an exit pupil is formed is moved in the retinal projection display device of FIG. 1A.
Figure 9I:
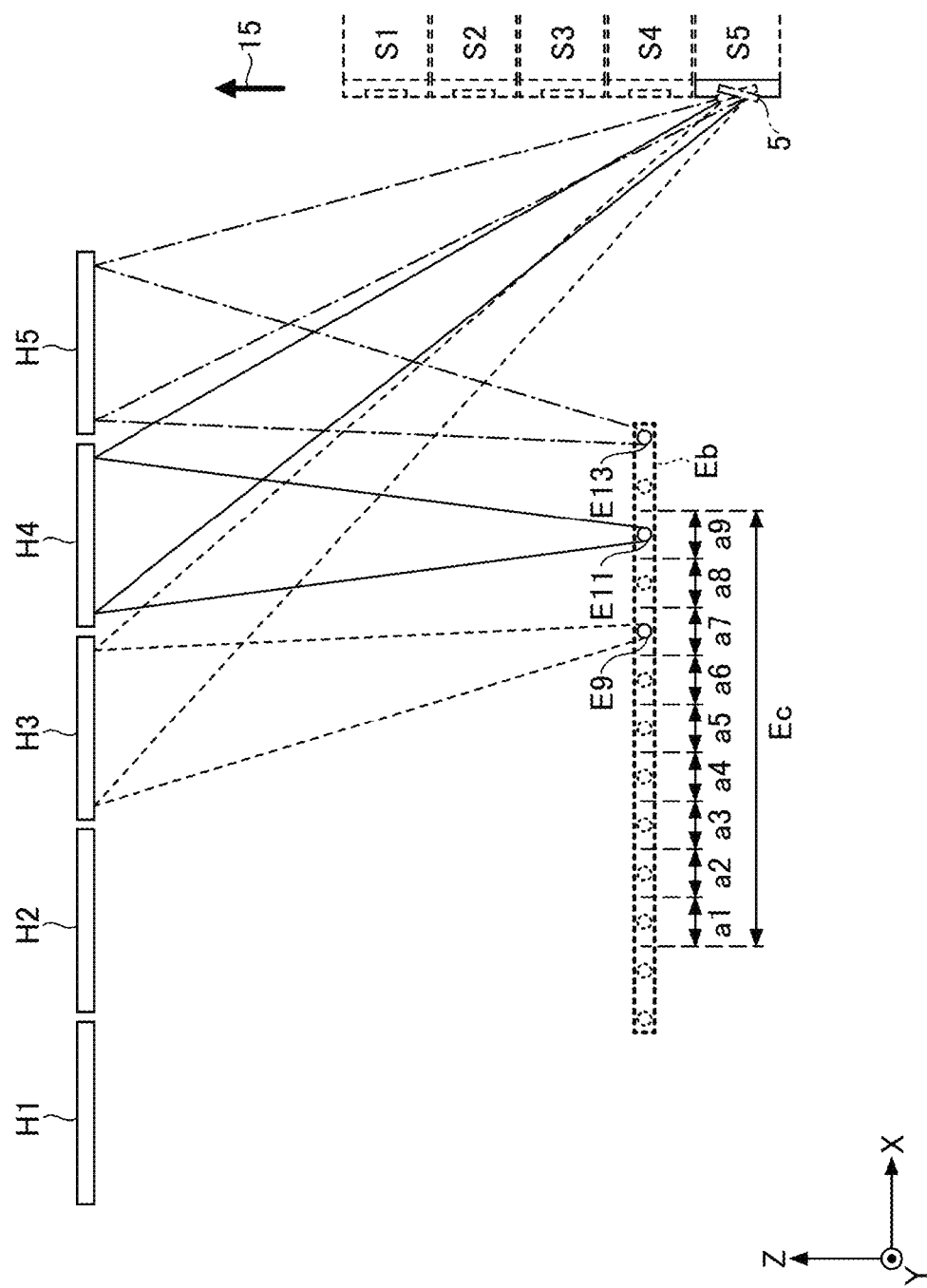
FIG. 9I is a ninth diagram illustrating an example in which the position where an exit pupil is formed is moved in the retinal projection display device of FIG. 1A.

FIG. 9A through FIG. 9I are diagrams illustrating examples in which the position where an exit pupil is formed is moved. The position where an exit pupil is formed is moved in the horizontal direction that is substantially parallel to the X direction. Specifically, FIG. 9A through FIG. 9I illustrate examples in which the position where an exit pupil is formed is moved in accordance with the center position of the pupil 61 of the wearer when the wearer is looking straight ahead. Looking straight ahead means that the wearer's eye is not rotated and is facing in the +Z direction in FIG. 9A through FIG. 9I. In FIG. 9A, the center of the pupil 61 is located in a region a1. In FIG. 9B, the center of the pupil 61 is located in a region a2. In FIG. 9C, the center of the pupil 61 is located in a region a3. In FIG. 9D, the center of the pupil 61 is located in a region a4. In FIG. 9E, the center of the pupil 61 is located in a region a5. In FIG. 9F, the center of the pupil 61 is located in a region a6. In FIG. 9G, the center of the pupil 61 is located in a region a7. In FIG. 9H, the center of the pupil 61 is located in a region a8. In FIG. 9i, the center of the pupil 61 is located in a region a9.

In FIG. 9A through FIG. 9I, the retinal projection display device 100 generates image light Lm by causing the optical scanner 4 to scan the laser beams Lr1. Then, the retinal projection display device 100 causes the image light Lm to be incident on the optical deflector 5. The image light Lm is deflected in a different direction toward a different position along the X direction in accordance with the inclination of the reflective surface of the optical deflector 5, and is incident on the projector 6. The projector 6 changes the projection direction 51 (see FIG. 1A) of the image Im in accordance with the direction of the incident image light Lm. That is, the optical deflector 5 can change the projection direction of the image Im by the projector 6. Further, the optical deflector can be translated along the extending direction 15 by the translation member 9, and the position of the optical deflector 5 can be changed to a different position Si in the extending direction 15.

The retinal projection display device 100 can switch a hologram region on which the image light Lm is incident by a combination of the position of the optical deflector 5 and the inclination of the reflective surface of the optical deflector 5. Further, the image light Lm can be incident on the same hologram region among the hologram regions H1 to H10 at different incidence angles. In other words, the controller 8 illustrated in FIG. 1A can control the operation of the optical deflector 5 such that light from the optical scanner 4 can be emitted to at least one or more of the hologram regions H1 to H10.

In the present embodiment, the eye-box region Eb, which is a set of exit pupils provided by the retinal projection display device 100, is set in advance. In the present embodiment, the region Ec of the eye-box is divided into regions a1 to a9. First, the line-of-sight detector 7 estimates a region, among the regions a1 to a9 of the region Ec of the eye-box, where the center of the pupil 61 of the wearer is located in a state in which the wearer is looking straight ahead. In the present embodiment, a hologram region used to form an exit pupil among the hologram regions H1 to H10, the position Si of the optical deflector 5, and the inclination of the reflective surface of the optical deflector 5 are determined based on the region, among the region a1 to a9, where the center of the pupil 61 of the wearer is located when the wearer is looking straight ahead.

As illustrated in FIG. 9A, if the center of the pupil 61 of the wearer is located in the region a1 when the wearer is looking straight ahead, the optical deflector 5 is located at a position S1. The retinal projection display device 100 uses the hologram regions H1 to H3 among the hologram regions H1 to H10. The image light Lm formed by the optical scanner 4 is incident on a hologram region in accordance with the inclination of the reflective surface of the optical deflector 5. For example, image light L2 indicated by a dashed line in FIG. 9A is incident on the hologram region H1. Image light L1 indicated by a solid line in FIG. 9A is incident on the hologram region H2. Image light L3 indicated by a dash-dot line in FIG. 9A is incident on the hologram region H3.

The image light L2 satisfies incident light conditions under which the hologram region H1 functions as a hologram. The image light L1 satisfies incident light conditions under which the hologram region H2 functions as a hologram. The image light L3 satisfies incident light conditions under which the hologram region H3 functions as a hologram. Therefore, the image light L2 is reflected and focused in the hologram region H1 of the projector 6, thereby forming an exit pupil E1. The image light L1 is reflected and focused in the hologram region H2 of the projector 6, thereby forming an exit pupil E3. The image light L3 is reflected and focused in the hologram region H3 of the projector 6, thereby forming an exit pupil E5.

The exit pupil E3 aligns or overlaps with the pupil 61 of the wearer in a state in which the wearer is looking straight ahead. The exit pupil E1 is located on the left side as viewed from the wearer. The exit pupil E5 is located on the right side as viewed from the wearer.

The exit pupil E1 aligns or overlaps with the pupil 61 when the line of sight is moved to the left beyond a certain limited angle of view in which the image is viewable through the exit pupil E3. Conversely, the exit pupil E5 aligns or overlaps with the pupil 61 when the line of sight is moved to the right beyond the certain limited angle of view in which the image is viewable through the exit pupil E3. That is, even when the line of sight is moved to the left or the right beyond the certain limited angle of view in which the image is viewable through the exit pupil E3, the wearer can view the image Im within a certain limited angle of view. As a result, a viewable region extending across three fields of view is provided, and thus, the viewing zone can be expanded. A distance Ea between the exit pupil E1 and the exit pupil E3 is, for example, 2 mm. The distance between an exit pupil Ei and an exit pupil Ei+2 is also 2 mm.

As illustrated in FIG. 9B, if the center of the pupil 61 of the wearer is located in the region a2 when the wearer is looking straight ahead, the optical deflector 5 is located at a position S2. The retinal projection display device 100 uses the hologram regions H1 to H3 among the hologram regions H1 to H10. The image light Lm formed by the optical scanner 4 is incident on a hologram region in accordance with the inclination of the reflective surface of the optical deflector 5. For example, image light L5 indicated by a dashed line in FIG. 9B is incident on the hologram region H1. Image light L4 indicated by a solid line in FIG. 9B is incident on the hologram region H2. Image light L6 indicated by a dash-dot line in FIG. 9B is incident on the hologram region H3.

The image light L5 satisfies the incident light conditions under which the hologram region H1 functions as a hologram. The image light L4 satisfies the incident light conditions under which the hologram region H2 functions as a hologram. The image light L6 satisfies the incident light conditions under which the hologram region H3 functions as a hologram.

In FIG. 9B, the incident angles of the image light incident on the hologram regions H1 to H3 are smaller than those in FIG. 9A. In general, in a reflection-type diffractive optical element, the reflection angle decreases as the incident angle decreases. That is, as compared to those in FIG. 9A, the positions of exit pupils formed by the hologram regions H1 to H3 are moved in the +X axis direction, which is the direction in which the reflection angle decreases. Therefore, the image light L5 is reflected and focused in the hologram region H1 of the projector 6, thereby forming an exit pupil E2. The image light L4 is reflected and focused in the hologram region H2 of the projector 6, thereby forming an exit pupil E4. The image light L6 is reflected and focused in the hologram region H3 of the projector 6, thereby forming an exit pupil E6.

The exit pupil E4 aligns or overlaps with the pupil 61 of the wearer in a state in which the wearer is looking straight ahead. The exit pupil E2 is located on the left side as viewed from the wearer. The exit pupil E6 is located on the right side as viewed from the wearer.

The exit pupil E2 aligns or overlaps with the pupil 61 when the line of sight is moved to the left beyond a certain limited angle of view in which the image is viewable through the exit pupil E4. Conversely, the exit pupil E6 aligns or overlaps with the pupil 61 when the line of sight is moved to the right beyond the certain limited angle of view in which the image is viewable through the exit pupil E4. That is, similar to FIG. 9A, even when the line of sight is moved to the left or the right beyond the certain limited angle of view in which the image is viewable through the exit pupil E4, the wearer can view the image Im within a certain limited angle of view. As a result, a viewable region extending across three fields of view is provided, and thus, the viewing zone can be expanded. A distance Ed between the exit pupil E1 and the exit pupil E2 is, for example, 1 mm. The distance between an exit pupil Ei and an exit pupil Ei+1 is also 1 mm.

The same applied to FIG. 9C through FIG. 9I. As illustrated in FIG. 9C, if the center of the pupil 61 of the wearer is located in the region a3 when the wearer is looking straight ahead, the optical deflector 5 is located at a position S3. The retinal projection display device 100 uses the hologram regions H1 to H3 among the hologram regions H1 to H10.

The exit pupil E5 aligns or overlaps with the pupil 61 of the wearer in a state in which the wearer is looking straight ahead. The exit pupil E3 is located on the left side as viewed from the wearer. An exit pupil E7 is located on the right side as viewed from the wearer.

The exit pupil E3 aligns or overlaps with the pupil 61 when the line of sight is moved to the left beyond a certain limited angle of view in which the image is viewable through the exit pupil E5. Conversely, the exit pupil E7 aligns or overlaps with the pupil 61 when the line of sight is moved to the right beyond the certain limited angle of view in which the image is viewable through the exit pupil E5.

As illustrated in FIG. 9D, if the center of the pupil 61 of the wearer is located in the region a4 when the wearer is looking straight ahead, the optical deflector 5 is located at the position S2. The retinal projection display device 100 uses the hologram regions H2 to H4 among the hologram regions H1 to H10.

The exit pupil E6 aligns or overlaps with the pupil 61 of the wearer in a state in which the wearer is looking straight ahead. The exit pupil E4 is located on the left side as viewed from the wearer. An exit pupil E8 is located on the right side as viewed from the wearer.

The exit pupil E4 aligns or overlaps with the pupil 61 when the line of sight is moved to the left beyond a certain limited angle of view in which the image is viewable through the exit pupil E6. Conversely, the exit pupil E8 aligns or overlaps with the pupil 61 when the line of sight is moved to the right beyond the certain limited angle of view in which the image is viewable through the exit pupil E6.

As illustrated in FIG. 9E, if the center of the pupil 61 of the wearer is located in the region a5 when the wearer is looking straight ahead, the optical deflector 5 is located at the position S3. The retinal projection display device 100 uses the hologram regions H2 to H4 among the hologram regions H1 to H10.

The exit pupil E7 aligns or overlaps with the pupil 61 of the wearer in a state in which the wearer is looking straight ahead. The exit pupil E5 is located on the left side as viewed from the wearer. An exit pupil E9 is located on the right side as viewed from the wearer.

The exit pupil E5 aligns or overlaps with the pupil 61 when the line of sight is moved to the left beyond a certain limited angle of view in which the image is viewable through the exit pupil E7. Conversely, the exit pupil E9 aligns or overlaps with the pupil 61 when the line of sight is moved to the right beyond the certain limited angle of view in which the image is viewable through the exit pupil E7.

As illustrated in FIG. 9F, if the center of the pupil 61 of the wearer is located in the region a6 when the wearer is looking straight ahead, the optical deflector 5 is located at a position S4. The retinal projection display device 100 uses the hologram regions H2 to H4 among the hologram regions H1 to H10.

The exit pupil E8 aligns or overlaps with the pupil 61 of the wearer in a state in which the wearer is looking straight ahead. The exit pupil E6 is located on the left side as viewed from the wearer. An exit pupil E10 is located on the right side as viewed from the wearer.

The exit pupil E6 aligns or overlaps with the pupil 61 when the line of sight is moved to the left beyond a certain limited angle of view in which the image is viewable through the exit pupil E8. Conversely, the exit pupil E10 aligns or overlaps with the pupil 61 when the line of sight is moved to the right beyond the certain limited angle of view in which the image is viewable through the exit pupil E8.

As illustrated in FIG. 9G, if the center of the pupil 61 of the wearer is located in the region a7 when the wearer is looking straight ahead, the optical deflector 5 is located at the position S3. The retinal projection display device 100 uses the hologram regions H3 to H5 among the hologram regions H1 to H10.

The exit pupil E9 aligns or overlaps with the pupil 61 of the wearer in a state in which the wearer is looking straight ahead. The exit pupil E7 is located on the left side as viewed from the wearer. An exit pupil E11 is located on the right side as viewed from the wearer. The exit pupil E7 aligns or overlaps with the pupil 61 when the line of sight is moved to the left beyond a certain limited angle of view in which the image is viewable through the exit pupil E9. Conversely, the exit pupil E11 aligns or overlaps with the pupil 61 when the line of sight is moved to the right beyond the certain limited angle of view in which the image is viewable through the exit pupil E9.

As illustrated in FIG. 9H, if the center of the pupil 61 of the wearer is located in the region a8 when the wearer is looking straight ahead, the optical deflector 5 is located at the position S4. The retinal projection display device 100 uses the hologram regions H3 to H5 among the hologram regions H1 to H10.

The exit pupil E10 aligns or overlaps with the pupil 61 of the wearer in a state in which the wearer is looking straight ahead. The exit pupil E8 is located on the left side as viewed from the wearer. An exit pupil E12 is located on the right side as viewed from the wearer.

The exit pupil E8 aligns or overlaps with the pupil 61 when the line of sight is moved to the left beyond a certain limited angle of view in which the image is viewable through the exit pupil E10. Conversely, the exit pupil E12 aligns or overlaps with the pupil 61 when the line of sight is moved to the right beyond the certain limited angle of view in which the image is viewable through the exit pupil E10.

As illustrated in FIG. 9I, if the center of the pupil 61 of the wearer is located in the region a9 when the wearer is looking straight ahead, the optical deflector 5 is located at a position S5. The retinal projection display device 100 uses the hologram regions H3 to H5 among the hologram regions H1 to H10.

The exit pupil E11 aligns or overlaps with the pupil 61 of the wearer in a state in which the wearer is looking straight ahead. The exit pupil E9 is located on the left side as viewed from the wearer. An exit pupil E13 is located on the right side as viewed from the wearer.

The exit pupil E9 aligns or overlaps with the pupil 61 when the line of sight is moved to the left beyond a certain limited angle of view in which the image is viewable through the exit pupil E11. Conversely, the exit pupil E13 aligns or overlaps with the pupil 61 when the line of sight is moved to the right beyond the certain limited angle of view in which the image is viewable through the exit pupil E11.

As described, in the retinal projection display device 100, each of the exit pupils E1 to E13 can be formed within the eye-box region Eb by a combination of the position of the optical deflector 5, the inclination of the reflective surface of the optical deflector 5, and a hologram region to be used among the hologram regions H1 to H10. The length of the eye-box region Eb is, for example, 12 mm when Ed is 1 mm.

The image light can incident on the same hologram region at different incident angles by changing the position of the optical deflector 5 and the inclination of the reflective surface of the optical deflector 5. By causing the image light Lm to satisfy allowable incident angle ranges of the hologram regions, the image light Lm can be focused on the exit pupils E1 to E13.

In the present embodiment, the line-of-sight detector 7 estimates a region, among the regions a1 to a9 of the region Ec of the eye-box, where the center of the pupil 61 is located in a state in which the wearer is looking straight ahead. Based on the estimated region, a combination of the position of the optical deflector 5, the inclination of the reflective surface of the optical deflector 5, and hologram regions to be used among the hologram regions H1 to H10 is determined. The length of the region Ec of the eye-box is 8 mm when Ed is 1 mm. In general, the interpupillary distance varies from person to person. However, in the present embodiment, any wearer can view the image Im within a certain limited angle of view as long as the center of the pupil 61 is located within the region Ec of the eye-box in a state in which the wearer is looking straight ahead. A viewable region extending across three left, middle, and right fields of view can be provided. The wearer can selectively view the image Im by changing the line-of-sight direction.

In the projector 6, the hologram regions H1 to H5 are separately provided. Thus, the focusing properties of each of the hologram regions can be optimized. Accordingly, uniform image quality can be provided in a field of view provided by each of the exit pupils E1 to E13.

Limited viewing angles provided by the exit pupils E1 to E13 in the retinal projection display device 100 may be the same or may be different. Each of the limited viewing angles is obtained by multiplying a horizontal viewing angle by a vertical viewing angle, and may be 10 degrees×6 degrees, 15 degrees×9 degrees, 20 degrees×12 degrees, or the like.

In FIG. 9A through FIG. 9I, the hologram regions H1 to H5 of the projector 6 are used to move the position of an exit pupil in the horizontal direction; however, the hologram regions H6 to H10 of the projector 6 may be used to move the position of an exit pupil in the horizontal direction. In this case, an eye-box region Evb, which is a set of exit pupils formed by the hologram regions H6 to H10, is located on the +Y side relative to the hologram regions H1 to H5.

The optical deflector 5 according to the present embodiment includes the vector scanning MEMS mirror. Thus, the image light can be deflected in different directions toward different positions along the Y direction.

The hologram regions H6 to H10 are located on the +Y side relative to the hologram regions H1 to H5 and positioned higher than the hologram regions H1 to H5 as viewed from the wearer. That is, any wearer can view the image Im within a certain limited angle of view as long as the center of the pupil 61 is located within the region Ec of the eye-box in a state in which the wearer is looking straight ahead. A viewable region extending across three upper left, upper middle, and upper right fields of view can be provided.

The wearer can selectively view the image by changing the line-of-sight direction. That is, in the retinal projection display device 100, any wearer can view the image Im within a certain limited angle of view as long as the center of the pupil 61 is located within the region Ec of the eye-box in a state in which the wearer is looking straight ahead. A viewable region extending across six fields of view, which are left, middle, right, upper left, upper middle, and upper right fields of view, can be provided to the wearer. The wearer can selectively view the image Im by changing the line-of-sight direction.

Figure 10:
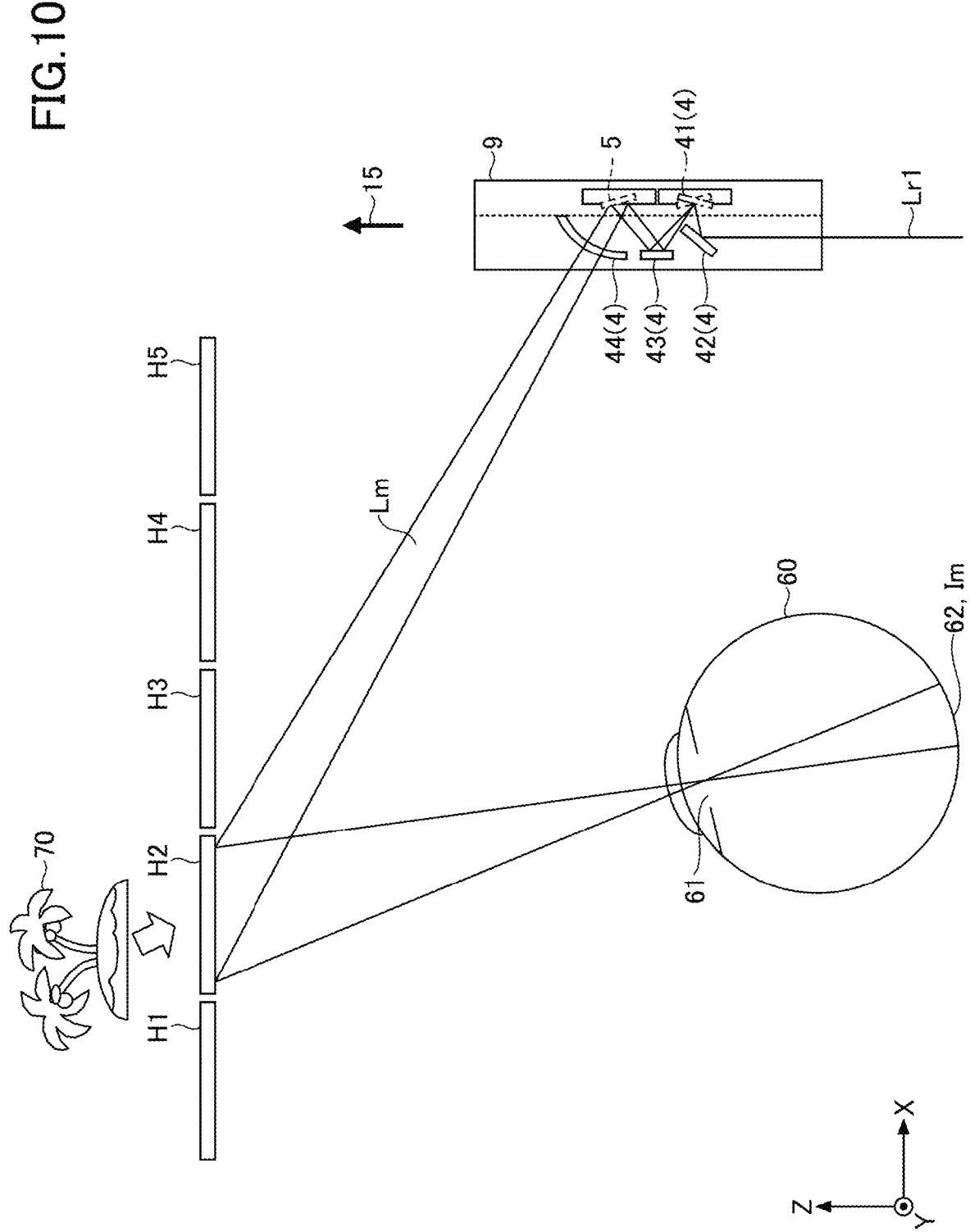
FIG. 10 is a diagram illustrating effects of the retinal projection display device of FIG. 1A.

FIG. 10 is a diagram illustrating the operation and effects of the retinal projection display device 100. In FIG. 10, the laser beams Lr1 are scanned by the oscillation mirror 41 so as to generate the image light Lm. The image light Lm is incident on the projector 6 after being reflected by the reflective surface of the optical deflector 5. Then, the image light Lm is reflected by the projector 6, converges once near the center of the pupil 61 of the eye 60 of the wearer, and then projected onto the retina 62 of the wearer. The wearer can visually recognize the image Im projected onto the retina 62.

Light that propagates in the −Z axis direction from an object 70 in the real space is light having a wide wavelength band including the wavelength band of visible light. A wavelength band in which the holograms of the projector 6 function is very narrow as compared to the wavelength band of visible light, and thus, the projector 6 has excellent transmissivity. Therefore, a major portion of the light propagating from the object 70 in the real space toward the eye 60 is transmitted through the projector 6, and reaches the retina 62 of the wearer. Accordingly, an image of the object 70 in the real space is viewed with sufficient brightness. In this manner, the wearer can view the image Im and the image of the object 70 simultaneously. The wearer can view both the image Im and the image in the real space in a bright state.

In the present embodiment, since the image Im is formed directly on the retina 62 of the wearer by using the Maxwellian view, the wearer can clearly visually recognize the image Im when the wearer's eye is focused at any position in the real space. Typical retinal-projection-type devices using the Maxwellian view have the disadvantage that a viewing zone is relatively narrow since image light Lm focuses on a pupil 61 once. With the narrow viewing zone, the image Im would disappear from the wearer's field of view even when the wearer slightly changes the line of sight.

Conversely, in the present embodiment, the optical deflector 5 can change the projection direction of the image Im by the projector 6 in the X direction and the Y direction. Further, the optical deflector 5 can be translated in the extending direction 15 by the translation member 9, and thus the position of the optical deflector 5 can be switched to a different position Si in the extending direction 15. That is, the retinal projection display device 100 can change a hologram region on which the image light Lm is incident by a combination of the position of the optical deflector and the inclination of the reflective surface of the optical deflector 5. The retinal projection display device 100 can make the image light Lm incident on the same hologram region at different incident angles.

In the present embodiment, the eye-box region Eb, which is a set of exit pupils provided by the retinal projection display device 100, is set in advance. Further, the region Ec of the eye-box is divided into the regions a1 to a9. First, the line-of-sight detector 7 estimates a region, among the regions a1 to a9 of the region Ec of the eye-box, where the center of the pupil 61 of the wearer is located in a state in which the wearer is looking straight ahead. In the present embodiment, a hologram region used to form an exit pupil, the position Si of the optical deflector 5, and the inclination of the reflective surface of the optical deflector 5 are determined based on the region, among the region a1 to a9, where the center of the pupil 61 of the wearer is located when the wearer is looking straight ahead. Then, the translation member 9 translates the optical deflector 5 to a desired position through a manual operation by the wearer. In general, the interpupillary distance varies from person to person. However, in the present embodiment, any wearer can view the image Im within a certain limited angle of view as long as the center of the pupil 61 is located within the region Ec of the eye-box in a state in which the wearer is looking straight ahead. A viewable region extending across six fields of view, which are left, middle, right, upper left, upper middle, and upper right fields of view, can be provided to the wearer. The wearer can selectively view the image Im by changing the line-of-sight direction.

In the present embodiment, a hologram region to be used to form an exit pupil, the position Si of the optical deflector 5, and the inclination of the reflective surface of the optical deflector 5 are determined based on a region, among the regions a1 to a9 of the region Ec of the eye-box, where the center of the pupil 61 of the wearer is located when the wearer is looking straight ahead. Therefore, after the wearer wears the retinal projection display device 100 on the head, the wearer simply performs an operation for translating the translation member 9 in accordance with an instruction. That is, in the present embodiment, the position of an exit pupil can align or overlap with the position of the pupil 61 of the wearer by a simple and semiautomated process. Accordingly, although the retinal projection display device 100 is of a retinal projection type, the viewing zone can be expanded.

In the present embodiment, the line-of-sight direction estimation unit 801 (see FIG. 5) is included. The line-of-sight direction estimation unit 801 can estimate, among the six fields of view, a field of view to which the wearer's line of sight is directed. By controlling the inclination of the reflective surface of the optical deflector 5 such that an image is displayed in the estimated field of view, the wearer can view the image in any of the six fields of view. In other words, the wearer can view the image in one of the six fields of view to which the wearer's line of sight is directed. Accordingly, the image can always be displayed in any of the six fields of view that the wearer is facing. That is, image projection that follows the line of sight is possible. Note that the same image may be projected in the six fields of view or different images may be projected in the six fields of view. For example, if the same image is always projected regardless of whether the line-of-sight direction is changed, the same image can always be displayed no matter where the wearer looks within the range of the six fields of view. This is useful for those who want to display information in front of the lines of sight at all times during field work support in manufacturing industries and the like, and for general consumers who want to check information that they are looking at in their daily lives.

If different images are projected in the six fields of view, for example, information and data necessary to be displayed in front of the wearer's line of sight can be determined and set in advance. In this manner, the necessary information can be checked by directing the line of sight to a corresponding field of view when necessary. In other words, it is possible to provide visual experience according to the intention of the wearer, that is, the wearer can view information when the wearer wants to view it. This cannot be achieved by a viewing zone replication method as observed in the related-art technologies. Accordingly, for example, if the wearer is a worker at a manufacturing site or an infrastructure inspector, the wearer can view digital content such as work instructions in a clear field of view without an interruption of work in the real space by moving the line of sight at a necessary timing. In addition, the wearer can be engaged in the work without visual stress because of the focus-free state. Thus, the work efficiency is expected to be further improved as compared to the related-art technologies.

As described above, the retina projection display device 100 can provide a new added value that provides digital content with sufficient visual quality. Therefore, the retina projection display device 100 can be used in a variety of applications such as educational support, surgery support, and life support in addition to the above-described applications.

Further, in the present embodiment, the viewing angle of the image Im formed by the optical scanner 4 remains within one field of view. As controlled by the optical deflector 5 in accordance with the third drive signal Dr3, the projection direction 51 of the image Im is changed to be within a field of view in which the wearer's line of sight is located among the six fields of view. That is, the resolution at which scanning is performed within one field of view is maintained in any of the other fields of view, and the resolution does not change depending on the field of view. In general, when an image is displayed based on laser scanning, the resolution decreases as the viewing angle of the image to be viewed by the wearer increases. However, in the retinal projection display device 100, the viewing zone in which an image is viewable can be expanded, and a field of view in which the image Im can be displayed without degrading the resolution can be expanded.

Further, in the present embodiment, the optical scanner 4 and the optical deflector 5 may be arranged side by side in the extending direction 15 of the temple 10. As a result, the length of the temple 10 in the direction orthogonal to the extending direction 15 can be reduced, and thus, the size of the retinal projection display device 100 can be reduced. In particular, the surface of the support substrate of the oscillation mirror 41 of the optical scanner 4 and the surface of the support substrate of the optical deflector 5 are preferably coplanar, and are preferably disposed substantially parallel to the extending direction 15. Accordingly, the size of the folded light-guide structure can be further reduced. In addition, since the optical scanner 4 is translated along the extending direction 15 by the translation member 9, the operation of the optical scanner 4 can be completed within the temple 10. Accordingly, the appearance does not change even after the optical scanner 4 is translated, and the eyeglass-type support can be formed in a small size in a stylish manner.

After a manual operation is performed by the wearer, an exit pupil can be switched by controlling the optical deflector 5 including the MEMS mirror in accordance with the third drive signal Dr3. Therefore, the viewing zone can be expanded without using any mechanism or device that requires physical operation. Accordingly, the retinal projection display device 100 can be produced in a small size, and the eyeglass-type support can be produced in a small size equivalent to the size of a conventional eyeglass frame.

The translation member 9 may integrally translate the optical scanner 4 and the optical deflector 5 such that the optical scanner 4 and the optical deflector 5 are located at each of the plurality of positions (positions S1 to S5) discretely arranged along the extending direction 15. Accordingly, the position where an exit pupil is formed can be easily changed.

Further, in the above-described embodiment, the optical scanner 4 and the optical deflector 5 are integrated; however, the present invention is not limited thereto. For example, the translation member 9 may translate the optical scanner 4 and the optical deflector 5 that are separated, along the extending direction 15 of the temple 10. In this case, the translation member 9 preferably translates optical scanner 4 and the optical deflector 5 so as not to change the positional relationship between the optical scanner 4 and the optical deflector 5.

The projector 6 may include the plurality of separated projectable regions (hologram regions H1 to H10). The optical deflector 5 may be disposed in the optical path between the optical scanner 4 and the projector 6. The controller 8 may control the operation of the optical deflector 5 such that light from the optical scanner 4 is emitted to one or more projectable regions among the plurality of separated projectable regions. Accordingly, while reducing the size of the retinal projection display device 100, the image-forming performance of the projector 6 can be improved, and the quality of the image Im can be improved.

The holographic optical element (projector 6) may include the reflective focusing elements. Accordingly, the image-forming performance of the projector 6 can be improved, and the quality of the image Im can be improved.

The controller 8 may control the operation of the optical deflector 5 in accordance with the position and the inclination of the eye 60 of the wearer. Accordingly, even when the eye 60 is moved, the viewing zone in which an image is viewable can be maintained.

The retinal projection display device 100 may include the operation member 20 configured to operate the translation member 9 such that the positions of the optical scanner 4 and the optical deflector 5 can be changed in accordance with the position and the inclination of the eye 60 of the wearer. Accordingly, even if the size of the eye 60 varies for each wearer, the viewing zone in which an image is viewable can be maintained.

The controller 8 may control the operation of the light source 2 based on image data. Accordingly, the image Im based on the image data can be projected onto the retina 62.

OTHER EMBODIMENTS

In the above-described first embodiment, the retinal projection display device 100 is a head-mounted display that is an example of a wearable device. The retinal projection display device 100 implemented as a head-mounted display may be a head-mounted display device directly that is worn on the head of a person, or may be a head-mounted display device that is indirectly worn on the head of a person via a member such as a fixing portion.

For example, the retinal projection display device according to the embodiments can also be applied to an optometric device. The optometric device refers to a device that can perform various examinations such as a visual acuity examination, a refractive power examination, an intraocular pressure examination, and an axial length examination. An optometric device 1000 can examine an eye of a subject without contacting the eye, and includes a light source 2 that emits light to the eye of the subject during an examination, a controller 8, and a measurement unit 1001. The subject looks at the light emitted from the light source 2. At this time, the position of the eye and the projection direction in which the light is easily visible differ for each subject, and thus an optical device according to the embodiments can be used. Further, by using the configuration of the retinal projection display device 100 described above, the optometric device 1000 can be formed of glass. Therefore, a large optometric device and a space are no longer necessary for an eye examination. Accordingly, the optometric device 1000 can perform an eye examination at any place with a simple configuration.

Further, if the subject is requested to look at a single point without moving the eye (line of sight) in order to improve the accuracy of measurement by the measurement unit, the retinal projection display device including the line-of-sight detector 7 illustrated in FIG. 1A can be utilized. Line of sight information acquired by the line-of-sight detector 7 is fed back to the controller such that measurement can be performed according to the position of the pupil of the eye.

Although the embodiments have been specifically described above, the present disclosure is not limited to the above-described embodiments and various modifications and variations may be made without departing from the scope of the present invention.

Each of the functions of the above-described controller 8 can be implemented by one or more processing circuits. As used herein, the term "processing circuit" means a processor programmed by software to execute the functions, such as a processor implemented by an electronic circuit, or devices such as application specific integrated circuits (ASICs), digital signal processors (DSPs), field programmable gate arrays (FPGAs), and conventional circuit modules designed to execute the functions of the above-described retinal projection display device 100.

The aspects of the present disclosure are, for example, as follows.

<1> A retinal projection display device for projection of an image onto a retina of a wearer wearing an eyeglass-type support is provided. The retinal projection display device includes the eyeglass-type support including a temple;

a light source;

an optical scanner disposed in the temple and configured to scan light from the light source so as to form the image;

a projector configured to project the image formed by the optical scanner onto the retina;

an optical deflector disposed in the temple and configured to change a projection direction of the image formed by the optical scanner; and a translation member configured to translate the optical scanner and the optical deflector in a direction in which the temple extends.

<2> The retinal projection display device according to <1>, wherein the light source emits the light in a direction substantially parallel to the direction in which the temple extends.

<3> The retinal projection display device according to <1>, wherein the optical scanner has a reflective surface that reflects the light from the light source, and in a state in which a drive voltage is not applied, the reflective surface is disposed substantially parallel to the direction in which the temple extends.

<4> The retinal projection display device according to <1>, wherein the optical deflector has a reflective surface that reflects the light from the light source, and in a state in which a drive voltage is not applied, the reflective surface is disposed substantially parallel to the direction in which the temple extends.

<5> The retinal projection display device according to <1>, wherein the optical scanner has a reflective surface that reflects the light from the light source, the optical deflector has a reflective surface that reflects the light from the light source, and in a state in which a drive voltage is not applied, the reflective surface of the optical scanner and the reflective surface of the optical deflector are disposed substantially parallel to each other.

<6> The retinal projection display device according to <1>, wherein the optical scanner and the optical deflector are arranged side by side in the direction in which the temple extends.

<7> The retinal projection display device according to any one of <1> to <6>, wherein the translation member integrally translates the optical scanner and the optical deflector such that the optical scanner and the optical deflector are located at each of a plurality of positions discretely arranged along the direction in which the temple extends.

<8> The retinal projection display device according to any one of <1> to <7>, further including:

a controller configured to control an operation of the optical scanner and an operation of the optical deflector, wherein the projector includes a plurality of separated projectable regions, the optical deflector is disposed in an optical path between the optical scanner and the projector, and the controller controls the operation of the optical deflector such that the light from the optical scanner is emitted to at least one or more projectable regions among the plurality of separated projectable regions.

<9> The retinal projection display device according to <8>, wherein the projector includes reflective focusing elements in correspondence with the plurality of separated projectable regions.

<10> The retinal projection display device according to <9>, wherein the reflective focusing elements are included in a holographic optical element.

<11> The retinal projection display device according to any one of <1> to <10>, further including:

a controller configured to control an operation of the optical scanner and an operation of the optical deflector, wherein the controller controls the operation of the optical deflector in accordance with a position and an inclination of an eye of the wearer wearing the eyeglass-type support.

<12> The retinal projection display device according to any one of <1> to <11>, further including:

an operation member configured to operate the translation member so as to change positions of the optical scanner and the optical deflector in accordance with a position and an inclination of an eye of the wearer wearing the eyeglass-type support.

<13> The retinal projection display device according to any one of <1> to <12>, further including:

a controller configured to control an operation of the optical scanner and an operation of the optical deflector, wherein the controller further controls an operation of the light source based on image data.

<14> A retinal projection display device for projection of an image onto a retina of a wearer is provided. The retinal projection display device includes:

a light source;

an optical scanner configured to scan light from the light source;

an optical deflector configured to deflect the light scanned by the optical scanner;

a projector configured to project the light deflected by the optical deflector onto the retina; and a translation member configured to translate the optical scanner and the optical deflector in a direction substantially parallel to a direction that the wearer is facing.

<15> A head-mounted display device including the retinal projection display device according to any one of <1> to <14>.

<16> An optometric device including the retinal projection display device according to any one of <1> to <14>.

The present disclosure can provide a retinal projection display device, a head-mounted display device, and an optometric device, in each of which a viewing zone can be expanded.

What is claimed is:

1. A retinal projection display device for projection of an image onto a retina of a wearer wearing an eyeglass-type support, the retinal projection display device comprising:

the eyeglass-type support including a temple;

a light source;

an optical scanner disposed in the temple and configured to scan light from the light source so as to form the image;

a projector configured to project the image formed by the optical scanner onto the retina;

an optical deflector disposed in the temple and configured to change a projection direction of the image formed by the optical scanner; and a translation member configured to translate the optical scanner and the optical deflector in a direction in which the temple extends.

2. The retinal projection display device according to claim 1, wherein the light source emits the light in a direction substantially parallel to the direction in which the temple extends.

3. The retinal projection display device according to claim 1, wherein the optical scanner has a reflective surface that reflects the light from the light source, and in a state in which a drive voltage is not applied, the reflective surface is disposed substantially parallel to the direction in which the temple extends.

4. The retinal projection display device according to claim 1, wherein the optical deflector has a reflective surface that reflects the light from the light source, and in a state in which a drive voltage is not applied, the reflective surface is disposed substantially parallel to the direction in which the temple extends.

5. The retinal projection display device according to claim 1, wherein the optical scanner has a reflective surface that reflects the light from the light source, the optical deflector has a reflective surface that reflects the light from the light source, and in a state in which a drive voltage is not applied, the reflective surface of the optical scanner and the reflective surface of the optical deflector are disposed substantially parallel to each other.

6. The retinal projection display device according to claim 1, wherein the optical scanner and the optical deflector are arranged side by side in the direction in which the temple extends.

7. The retinal projection display device according to claim 1, wherein the translation member integrally translates the optical scanner and the optical deflector such that the optical scanner and the optical deflector are located at each of a plurality of positions discretely arranged along the direction in which the temple extends.

8. The retinal projection display device according to claim 1, further comprising:

a controller configured to control an operation of the optical scanner and an operation of the optical deflector, wherein the projector includes a plurality of separated projectable regions, the optical deflector is disposed in an optical path between the optical scanner and the projector, and the controller controls the operation of the optical deflector such that the light from the optical scanner is emitted to at least one or more projectable regions among the plurality of separated projectable regions.

9. The retinal projection display device according to claim 8, wherein the projector includes reflective focusing elements in correspondence with the plurality of separated projectable regions.

10. The retinal projection display device according to claim 9, wherein the reflective focusing elements are included in a holographic optical element.

11. The retinal projection display device according to claim 1, further comprising:

a controller configured to control an operation of the optical scanner and an operation of the optical deflector, wherein the controller controls the operation of the optical deflector in accordance with a position and an inclination of an eye of the wearer wearing the eyeglass-type support.

12. The retinal projection display device according to claim 1, further comprising:

an operation member configured to operate the translation member so as to change positions of the optical scanner and the optical deflector in accordance with a position and an inclination of an eye of the wearer wearing the eyeglass-type support.

13. The retinal projection display device according to claim 1, further comprising:

a controller configured to control an operation of the optical scanner and an operation of the optical deflector, wherein the controller further controls an operation of the light source based on image data.

14. A head-mounted display device comprising:
the retinal projection display device of claim 1.

15. An optometric device comprising:
the retinal projection display device of claim 1.

16. A retinal projection display device for projection of an image onto a retina of a wearer, the retinal projection display device comprising:

a light source;

an optical scanner configured to scan light from the light source;

an optical deflector configured to deflect the light scanned by the optical scanner;

a projector configured to project the light deflected by the optical deflector onto the retina; and a translation member configured to translate the optical scanner and the optical deflector in a direction substantially parallel to a direction that the wearer is facing.

* * * * *